US008635357B2

(12) United States Patent
Ebersviller

(10) Patent No.: US 8,635,357 B2
(45) Date of Patent: Jan. 21, 2014

(54) DYNAMIC SELECTION OF PARAMETER SETS FOR TRANSCODING MEDIA DATA

(75) Inventor: Matthew Robert Ebersviller, Minneapolis, MN (US)

(73) Assignee: Google Inc., Mountain View, CA (US)

( * ) Notice: Subject to any disclaimer, the term of this patent is extended or adjusted under 35 U.S.C. 154(b) by 708 days.

(21) Appl. No.: 12/877,594

(22) Filed: Sep. 8, 2010

(65) Prior Publication Data

US 2011/0060792 A1    Mar. 10, 2011

Related U.S. Application Data

(60) Provisional application No. 61/240,528, filed on Sep. 8, 2009.

(51) Int. Cl.
*G06F 15/16* (2006.01)
*G06F 15/173* (2006.01)

(52) U.S. Cl.
USPC .................... 709/231; 709/224; 709/228

(58) Field of Classification Search
USPC ............................... 709/203, 231, 232
See application file for complete search history.

(56) References Cited

U.S. PATENT DOCUMENTS

| | | | | | |
|---|---|---|---|---|---|
| 5,983,251 | A | * | 11/1999 | Martens et al. | 708/203 |
| 6,128,346 | A | * | 10/2000 | Suarez et al. | 375/254 |
| 6,414,610 | B1 | * | 7/2002 | Smith | 341/106 |
| 6,937,770 | B1 | * | 8/2005 | Oguz et al. | 382/235 |
| 7,623,719 | B2 | * | 11/2009 | Molino et al. | 382/239 |
| 8,031,791 | B2 | * | 10/2011 | von der Embse | 375/262 |
| 8,065,594 | B2 | * | 11/2011 | Limberg | 714/786 |
| 8,086,054 | B2 | * | 12/2011 | Gioia et al. | 382/240 |
| 8,184,712 | B2 | * | 5/2012 | Mukherjee | 375/240.21 |
| 8,199,817 | B2 | * | 6/2012 | Kim et al. | 375/240.12 |
| 8,259,794 | B2 | * | 9/2012 | Bronstein et al. | 375/240.03 |
| 8,351,509 | B1 | * | 1/2013 | Hurd et al. | 375/240.16 |
| 2003/0128754 | A1 | * | 7/2003 | Akimoto et al. | 375/240.02 |
| 2004/0114817 | A1 | * | 6/2004 | Jayant et al. | 382/239 |
| 2004/0120398 | A1 | * | 6/2004 | Zhang et al. | 375/240.03 |
| 2005/0015259 | A1 | * | 1/2005 | Thumpudi et al. | 704/500 |
| 2005/0281471 | A1 | * | 12/2005 | LeComte | 382/232 |
| 2006/0233237 | A1 | * | 10/2006 | Lu et al. | 375/240.03 |
| 2006/0282677 | A1 | * | 12/2006 | Rodriguez et al. | 713/181 |
| 2007/0053427 | A1 | * | 3/2007 | Henocq | 375/240 |
| 2007/0286277 | A1 | * | 12/2007 | Chen | 375/240.03 |
| 2009/0086816 | A1 | * | 4/2009 | Leontaris et al. | 375/240.03 |
| 2009/0141990 | A1 | * | 6/2009 | Pigeon et al. | 382/233 |
| 2009/0150557 | A1 | * | 6/2009 | Wormley et al. | 709/231 |
| 2009/0265617 | A1 | * | 10/2009 | Randall et al. | 715/249 |
| 2009/0274212 | A1 | * | 11/2009 | Mizutani et al. | 375/240.12 |
| 2010/0061446 | A1 | * | 3/2010 | Hands et al. | 375/240.02 |

(Continued)

OTHER PUBLICATIONS

Dolbeau, Romain; "/org/dolbeau/mencgen/lavcGeneticMain.java"; Copyright 2004, 92 pages.

(Continued)

*Primary Examiner* — Karen Tang
(74) *Attorney, Agent, or Firm* — Turocy & Watson, LLP

(57) ABSTRACT

An iterative operation is performed at a computing device to identify a parameter set for an initial segment. A parameter set for an initial segment includes a plurality of encoding parameters and values assigned to the encoding parameters. The initial segment is re-encoded using the parameter set, thereby generating a transcoded segment. In some embodiments, the transcoded segment is transmitted to a client computing device that presents media represented by the transcoded segment.

27 Claims, 10 Drawing Sheets

(56) References Cited

U.S. PATENT DOCUMENTS

| | | | |
|---|---|---|---|
| 2010/0074518 A1* | 3/2010 | Tanizawa et al. | 382/166 |
| 2010/0125455 A1* | 5/2010 | Wang et al. | 704/219 |
| 2010/0268761 A1* | 10/2010 | Masson | 709/203 |
| 2010/0329329 A1* | 12/2010 | Reznik et al. | 375/240.2 |
| 2011/0026601 A1* | 2/2011 | Mueller et al. | 375/240.24 |
| 2011/0075734 A1* | 3/2011 | Sakazume | 375/240.12 |
| 2011/0150078 A1* | 6/2011 | Reznik et al. | 375/240.03 |
| 2011/0234430 A1* | 9/2011 | Normile et al. | 341/50 |
| 2011/0255595 A1* | 10/2011 | Zuo et al. | 375/240.03 |
| 2012/0014435 A1* | 1/2012 | Yang et al. | 375/240.03 |
| 2012/0020409 A1* | 1/2012 | Chang et al. | 375/240.03 |
| 2012/0275512 A1* | 11/2012 | Bouton et al. | 375/240.02 |

OTHER PUBLICATIONS

Dolbeau, Romain; "mencgen (formerly lavcGenetic), a genetic algorithm for mencoder encoding options"; Feb. 7, 2006; 1 page.

* cited by examiner

DYNAMIC SELECTION OF PARAMETER SETS FOR TRANSCODING MEDIA DATA

This application claims the benefit of U.S. Provisional Application No. 61/240,528, filed Sep. 8, 2009, the entirety of which is hereby incorporated by reference.

BACKGROUND

In some situations, a set of media data may be encoded in a way that is not suitable for distribution over a particular medium or for distribution to a particular type of device. For example, a bit rate of the set of media data may be too high for distribution to cellular telephones. In such situations, a distributor of the set of media data re-encodes the set of media data such that the set of media data is suitable for distribution over the particular medium or to the particular type of device. In other words, the distributor of the set of media data transcodes the initial set of media data into a transcoded set of media data.

A variety of encoding parameters govern how a set of media data is encoded in a media coding format. Example encoding parameters include a maximum keyframe interval, a minimum keyframe interval, a maximum number of B-frames between keyframes, which entropy decoder to use, and so on. Use of different values for encoding parameters to transcode initial sets of media data into transcoded sets of media data results in differences in data compression and/or differences in similarity between the initial sets of media data and the transcoded sets of media data.

SUMMARY

An iterative operation is used by a computing device to dynamically select a parameter set for an initial segment. A parameter set for an initial segment includes a plurality of encoding parameters and values assigned to the encoding parameters. The initial segment is re-encoded using the parameter set, thereby generating a transcoded segment. In some embodiments, the transcoded segment is transmitted to a client computing device that presents media represented by the transcoded segment.

This summary is provided to introduce a selection of concepts in a simplified form. These concepts are further described below in the Detailed Description. This summary is not intended to identify key features or essential features of the claimed subject matter, nor is this summary intended as an aid in determining the scope of the claimed subject matter.

DETAILED DESCRIPTION

Figure 1:
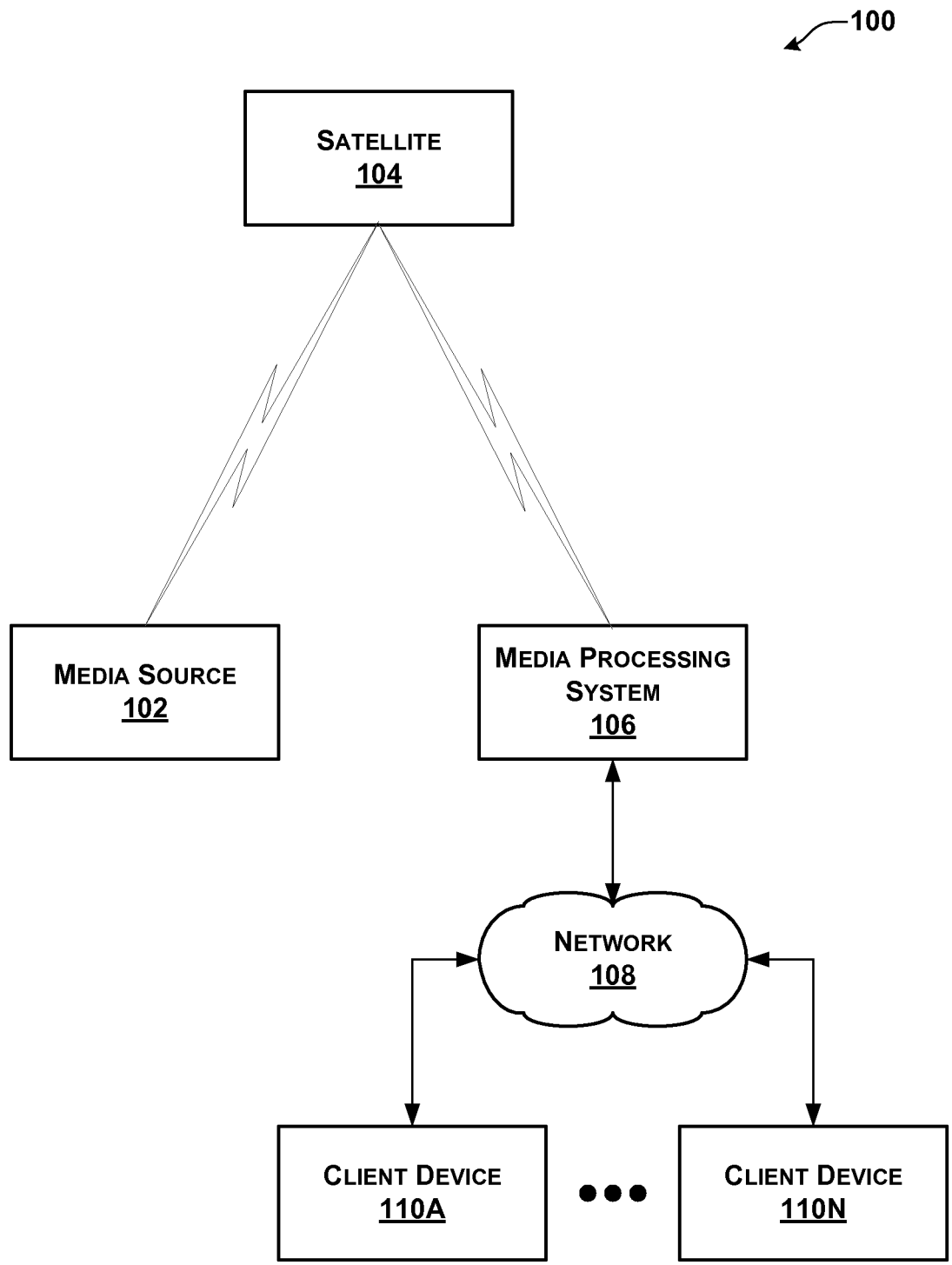
FIG. 1 is a block diagram illustrating an example system for distributing media data.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 is a block diagram illustrating an example system 100 for distributing media data. As illustrated in the example of FIG. 1, the system 100 includes a media source 102, a satellite 104, a media processing system 106, a network 108, and client devices 110A-110N (collectively, "client devices 110"). Other embodiments include more or fewer components, systems, people, organizations, and so on.

The media source 102 is a source of an initial media data stream. A media data stream is a succession of media data. In various embodiments, the media data includes audio data and/or video data. Audio data is data representing audible sound. Video data is data representing a sequence of video frames to be displayed in temporal succession to create the appearance of motion.

In different embodiments, the media source 102 may be a variety of different things. For example, the media source 102 may be a television station, a C-Band mobile satellite Earth station (e.g., a satellite truck), a Ku-Band mobile satellite Earth station, or another type of stationary or mobile machine that transmits a media data stream. In various instances, the media source 102 may be located at various geographic locations. For instance, the media source 102 may be a satellite truck located at a stadium where a live sporting event is occurring. In another instance, the media source 102 is located at a studio of a television station.

The satellite 104 is a communications satellite that receives and transmits media data. In other example embodiments, the system 100 includes a terrestrial retransmission system instead of the satellite 104.

The media processing system 106 is implemented as one or more computing devices. Computing devices include machines capable of computation. In different embodiments, the media processing system 106 is implemented in different ways. For instance, in different embodiments, the media processing system 106 is implemented as a standalone server device, a plurality of server devices, a supercomputer, a desktop computer, a laptop computer, a mainframe computer, a server farm, one or more server blades, and/or another type of computing device.

Each of the client devices 110 includes one or more computing devices. In various embodiments, the client devices 110 are implemented in various ways. For instance, in various embodiments, one or more of the client devices 110 are implemented as desktop computers, laptop computers, netbook computers, personal digital assistants, smart phones, television set-top boxes, televisions, personal media player devices, radios, devices integrated into vehicles, telephones, an network audio streaming device, a network video streaming device, and/or other types of computing devices.

The network 108 comprises a set of computing devices and a set of communication links The communication links facilitate communication between the computing devices in the network 108. The network 108 may include a wide variety of different types of computing devices. For instance, the network 108 may include switches, routers, hubs, bridges, firewalls, PBX devices, intrusion detection devices, proxy servers, relay devices, and other types of computing devices. In different embodiments, the network 108 is implemented at various scales. For instance, the network 108 may be implemented as an internet, a wide area network, a local area network, a personal area network, or a network implemented on another scale. Various communications protocols are used in the network 108. Example communications protocols include Hypertext Transfer Protocol (HTTP), Transport Control Protocol (TCP), Session Initiation Protocol (SIP), Ethernet, User Datagram Protocol (UDP), and other types of communications protocols.

The media source 102 transmits an initial media data stream to the satellite 104. The initial media data stream includes audio data and/or video data. For instance, in one example embodiment, the initial media data stream comprises data representing a series of video frames. In another example embodiment, the initial media data stream comprises data representing a series of audio samples. In yet another example embodiment, the initial media data stream comprises data representing a series of video frames and a series of corresponding audio samples.

In different embodiments, the initial media data stream is formatted in different ways. For instance, in one example embodiment, the initial media data stream is formatted according to the H.263 video coding format, H.264/MPEG-4 AVC video coding format, the Asynchronous Serial Interface (ASI) format, a Serial Digital Interface format, any of the TrueMotion VP formats, the Theora format, the Windows Media Video (WMV) format, or another video coding format.

The satellite 104 receives the initial media data stream from the media source 102. The satellite 104 transmits the initial media data stream such that the initial media data stream is received by the media processing system 106. In different embodiments, the satellite 104 stores the initial media data stream for different amounts of time. For instance, in one example embodiment, the satellite 104 stores the initial media data stream no longer than necessary to retransmit the initial media data stream. In another example embodiment, the satellite 104 stores the initial media data stream until the initial media data stream is requested at an indefinite time after the satellite 104 receives the initial media data stream.

The media processing system 106 receives the initial media data stream from the satellite 104. As the media processing system 106 receives the initial media data stream, the media processing system 106 divides the initial media data stream into a plurality of initial segments. Each of the initial segments comprises a set of media data representing media that, when played back, lasts a specific amount of time.

The media processing system 106 performs an iterative operation that dynamically selects a final parameter set. The media processing system 106 transcodes at least one of the initial segments into a transcoded segment using the final parameter set. A parameter set is a plurality of encoding parameters and values assigned to the encoding parameters. Each iteration of the iterative operation generates a parameter set and transcodes a segment using the parameter set. The final parameter set selected by the iterative operation is one of the parameter sets generated by one of the iterations of the iterative operation.

Each of the parameter sets generated by the iterative operation includes the same encoding parameters. However, the values assigned to the encoding parameters may differ among parameter sets for different initial segments. For example, each of the parameter sets includes a maximum keyframe interval parameter that specifies a maximum time that can be between keyframes. In this example, the value "6" may be assigned to the maximum keyframe interval parameter in the parameter set for one initial segment and the value "8" may be assigned to the maximum keyframe interval parameter in the parameter set for another initial segment.

In different embodiments, the parameter sets include different encoding parameters. For instance, in one example embodiment, the parameter sets include, but are not limited to, the following encoding parameters:

a motion estimation method parameter indicating a motion estimation method.
  a positive integer indicating a maximum number of pixels within with to search for a corresponding pixel.
  a non-negative floating point number indicating a quantization scale for differences between I-frames and P-frames.
  a non-negative floating point number indicating a quantization scale for differences between P-frames and B-frames.
  a non-negative floating point number indicating quantization parameter curve compression.
  a positive integer indicating a maximum time between keyframes.
  a positive integer indicating a minimum time between keyframes.
  a positive floating point number indicating a degree to which fluctuations in the quantization parameter are reduced before curve compression.
  a positive floating point number indicating a degree to which fluctuations in the quantization parameter are reduced before curve compression.
  a value indicating a motion estimation compare function.
  a true or false value indicating whether an in-loop deblocking filter is used to prevent blocking artifacts.
  a positive integer that indicates the sensitivity of scenecut detection.
  a true/false value indicating whether to add B-frames into the normal reference list.
  a true/false value indicating whether to allow or disallow B-frames to use weight prediction options.
  a true/false value indicating whether to allow or disallow each 8×8 macroblock to use different references.
  a true/false value indicating whether to allow or disallow an encoder to choose between 8×8 and 4×4 frequency transform size.
  a true/false value indicating whether to allow or disallow skipping of P-macroblocks that do not appear to change.
  a true/false value indicating whether to allow or disallow the encoder to use access unit delimiters.
  a true/false value indicating whether to allow or disallow the encoder to choose which coefficients to round up or down:
  a positive integer between 1 and 51 indicating a minimum quantizer.
  a positive integer between 1 and 51 indicating a maximum quantizer.
  a positive integer indicating a minimum step of the quantization parameter.
  a positive integer indicating number of frames to reference.
  a value indicating a prediction mode. Possible prediction modes include no prediction, spatial prediction, temporal prediction, or automatic prediction.
  combinations of inter and intra partitions parameter: a value indicating allowed combinations of partitions in macroblocks.

maximum number of B-frames between keyframes parameter: a positive integer indicating a maximum number of B-frames between keyframes:

a parameter indicating how adaptive B-frame look ahead is.

a parameter indicating which entropy encoder to use.

a non-negative integer indicating an alpha value for use in in-loop deblocking.

a non-negative integer indicating a beta value for use in in-loop deblocking.

a positive floating point number indicating a constant quality mode.

a parameter indicating algorithms used for both subpixel motion searching and partition decisions.

Each of the transcoded segments generated by the iterative operation is a set of media data representing the same media as an initial segment. However, the transcoded segment is encoded differently than the initial segment. For example, the transcoded segment and the initial segment can be encoded using different media coding formats. For instance, in this example, the initial segment may be encoded in ASI and the transcoded segment may be encoded in H.264. In another example, the transcoded segment and the initial segment can be encoded in the same media coding format, but with different encoding parameters. For instance, in this other example, the transcoded segment and the initial segment are encoded in the H.264 video coding format, but the transcoded segment is encoded with a maximum of three B-frames between keyframes and the initial segment is encoded with a maximum of two B-frame between keyframes. In yet another example, the transcoded segment and the initial segment are encoded in the same media coding format, but have different bit rates. In yet another example, the transcoded segment and the initial segment are encoded in the same media coding format, but frames represented by the transcoded segment and frames represented by the initial segment have different sizes.

The media processing system 106 transcodes at least one initial segment in the initial media data stream into a transcoded segment using the final parameter set. The final parameter set is one of the parameter sets generated by the iterative operation and used in the iterative operation to encode a transcoded segment having a fitness score greater than each other transcoded segment generated by the iterative operation. A fitness score is a measure of visual similarity between a transcoded segment and an initial segment from which the transcoded segment is generated.

In some embodiments, the media processing system 106 uses the iterative operation to select individual final parameter sets for each segment in the initial media data stream. As described elsewhere in this patent document, the iterative operation, in such embodiments, generates multiple parameter sets for an individual initial segment and transcodes the initial segment multiple times using the parameter sets before selecting one of the parameter sets as the final parameter set for the initial segment. In other embodiments, the media processing system 106 uses the iterative operation to select a final parameter set for the initial media data stream as a whole.

The media processing system 106 adds transcoded segments to an output buffer. In some example embodiments, the media processing system 106 adds the transcoded segment to the output buffer after the media processing system 106 transcodes the initial segment into the transcoded segment. In other example embodiments, the media processing system 106 adds the transcoded segment to the output buffer as the media processing system 106 transcodes the initial segment into the transcoded segment. The media processing system 106 transmits a transcoded media data stream to the client devices 110 via the network 108. The transcoded media data stream comprises the transcoded segments in the output buffer. Thus, by transcoding initial segments in the initial media data stream into transcoded segments and transmitting the transcoded segments as the transcoded media data stream, the media processing system 106 effectively transcodes the initial media data stream into the transcoded media data stream.

The client devices 110 decode the transcoded segments to produce presentation data. The client devices 110 then present the presentation data on appropriate output devices. For instance, where the transcoded segments represent video, the client devices 110 present the presentation data on display screens. Where the transcoded segments represent audio, the client devices 110 use speakers to present the presentation data.

Figure 2:
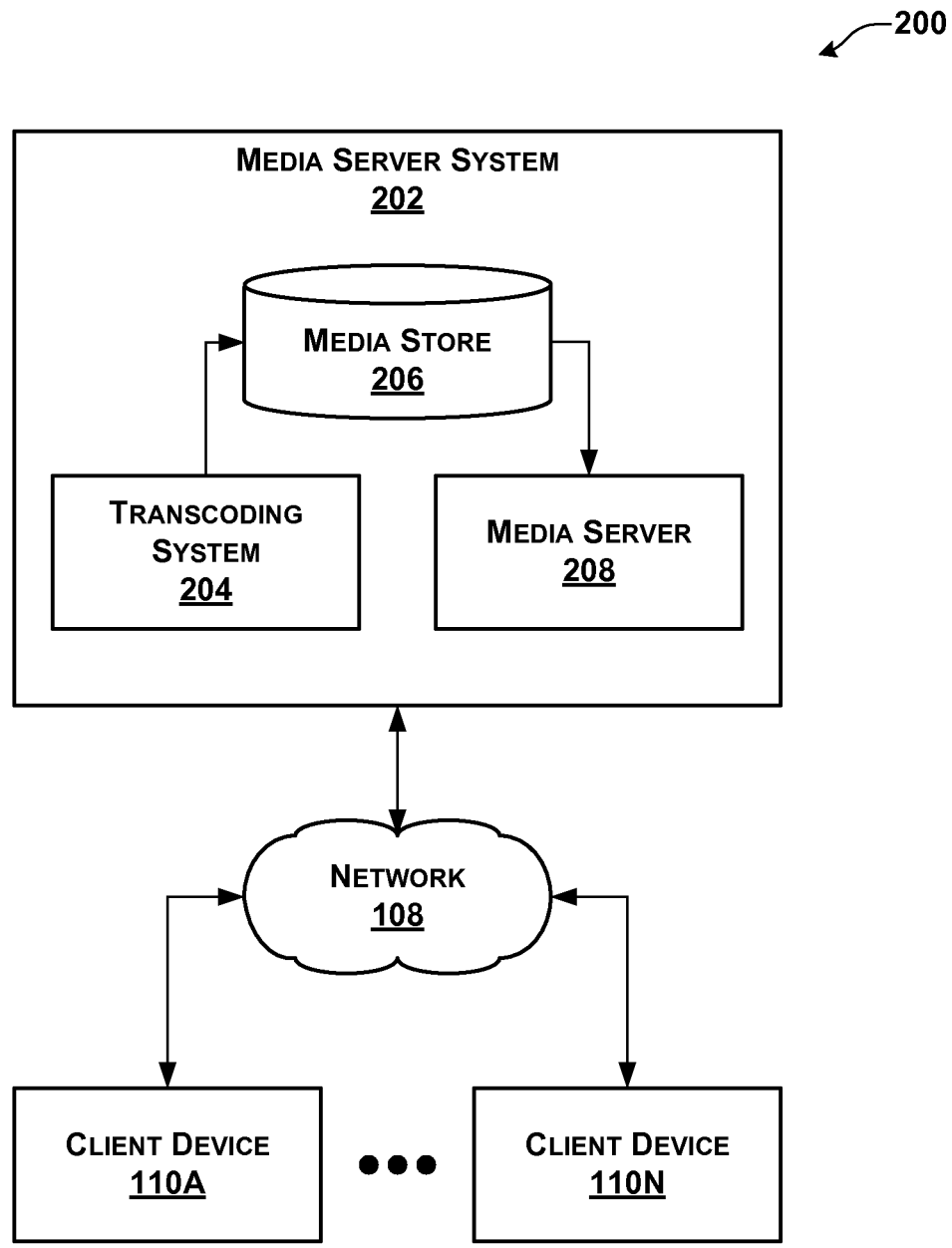
FIG. 2 is a block diagram illustrating another example system for distributing media data.

FIG. 2 is a block diagram illustrating a second example system 200 for distributing media data. As illustrated in the example of FIG. 2, the system 200 includes the client devices 110 and the network 108. The client devices 110 and the network 108 illustrated in the example of FIG. 2 may have same functionality and may be implemented in the same way as the client devices 110 and the network 108 illustrated in the example of FIG. 1. It should be appreciated that other systems include components other than those illustrated in the example of FIG. 2.

In contrast to the system 100 illustrated in the example of FIG. 1, the system 200 distributes previously stored media data. For instance, the system 200 may distribute previously-recorded television shows, music videos, movies, music recordings, and/or other types of previously-recorded media.

The system 200 includes a media server system 202. The media server system 202 includes at least one computing device. In different embodiments, the media server system 202 is implemented in different ways. For instance, in different embodiments, the media server system 202 is implemented as a standalone server device, a collection of standalone server devices, a desktop computer, a mainframe computer, one or more server blades, and/or other types of computing devices.

The media server system 202 stores media data and provides access to media data. In different embodiments, the media server system 202 is implemented in different ways. For instance, in the example of FIG. 2, the media server system 202 includes a transcoding system 204, a media store 206, and a media server 208.

In different embodiments, the transcoding system 204 is implemented in different ways. For instance, in one example embodiment, the transcoding system 204 is implemented as a set of software instructions stored on one or more computer-readable storage media. In this example embodiment, the software instructions, when executed by a processing unit of the media server system 202, cause the media server system 202 to provide the functionality of the transcoding system 204. In another example embodiment, the transcoding system 204 is implemented using one or more application-specific integrated circuits (ASICs) that cause the media server system 202 to provide the functionality of the transcoding system 204.

Likewise, in different embodiments, the media server 208 is implemented in different ways. For instance, in one example embodiment, the media server 208 is implemented as a set of software instructions stored on one or more computer-readable storage media. In this example embodiment, the software instructions, when executed by a processing unit of the media server system 202, cause the media server system 202 to provide the functionality of the media server 208.

In another example embodiment, the media server 208 is implemented using one or more ASICs that cause the media server system 202 to provide the functionality of the media server 208.

The media store 206, in different embodiments, is implemented in different ways. For instance, in one example embodiment, the media store 206 is implemented as a relational database. In another example embodiment, the media store 206 is implemented as a file system.

The media store 206 stores media files. In this patent document, media files are files that include one or more media data streams. For example, the media store 206 may store a plurality of video files. As described in more detail elsewhere in this patent document, the transcoding system 204 uses an iterative operation to select one or more final parameter sets. The transcoding system 204 uses the one or more final parameter sets to transcode at least some segments of the initial media files into transcoded media files. The transcoding system 204 then stores the transcoded media files into the media store 206.

The media server 208 receives requests for media files from the client devices 110 via the network 108. In different embodiments, the media server 208 receives different types of requests. For instance, in one example embodiment, the media server 208 receives HTTP GET requests specifying media files stored in the media store 206. In another example embodiment, the media server 208 receives remote procedure call requests. Furthermore, in different embodiments, the requests indicate different information. For instance, in one example embodiment, the requests explicitly specify a transcoded media file. In another example embodiment, the requests specify an initial media file stored in the media store 206. In yet other example embodiments, the requests specify transcoded media files and desired bit rates for the transcoded media files. In response to the requests, the media server 208 transmits transcoded media files to the client devices 110 via the network 108.

Figure 3:
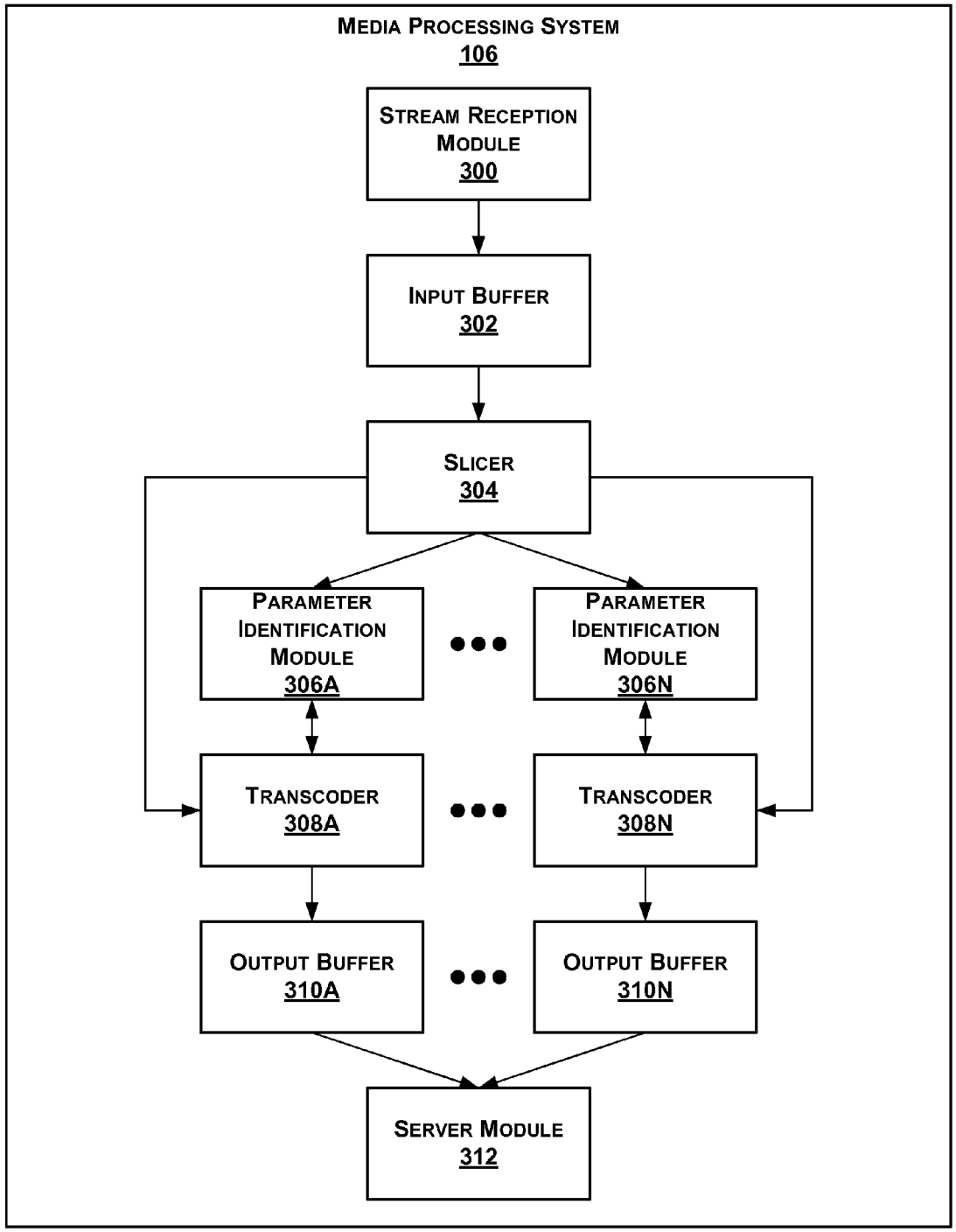
FIG. 3 is a block diagram illustrating example logical components of a media processing system.

FIG. 3 is a block diagram illustrating example logical components of the media processing system 106. As illustrated in the example of FIG. 3, the media processing system 106 comprises a stream reception module 300, an input buffer 302, a slicer 304, parameter identification modules 306A-306N, transcoders 308A-308N, output buffers 310A-310N, and a server module 312. In this patent document, the parameter identification modules 306A-306N are referred to collectively as "parameter identification modules 306," the transcoders 308A-308N are referred to collectively as "transcoders 308," and the output buffers 310A-310N are referred to collectively as "output buffers 310." It should be appreciated that in other embodiments, the media processing system 106 includes logical components other than those illustrated in the example of FIG. 3. For instance, some embodiments do not include the slicer 304.

The stream reception module 300 receives an initial media data stream. As the stream reception module 300 receives the initial media data stream, the stream reception module 300 stores data in the initial media data stream into the input buffer 302. In different embodiments, the stream reception module 300 receives the initial media data stream from different sources. For instance, in the example of FIG. 1, the stream reception module 300 receives the initial media data stream from the satellite 104. In another example embodiment, the stream reception module 300 receives the initial media data stream from a media input device, such as a camera and/or microphone. In yet another example embodiment, the stream reception module 300 receives the initial media data stream from a server device via a computer network, such as the Internet.

The slicer 304 asynchronously removes initial segments of the initial media data stream from the input buffer 302. In other words, the slicer 304 removes initial segments of the initial media data stream from the input buffer 302 while the stream reception module 300 is storing data in the initial media data stream into the input buffer 302. When the slicer 304 removes an initial segment from the input buffer 302, the slicer 304 provides the initial segment to each of the parameter identification modules 306.

In different embodiments, the slicer 304 removes from the input buffer 302 initial segments representing media lasting different amounts of time. For instance, in one example embodiment, the slicer 304 removes from the input buffer 302 initial segments representing media lasting five seconds. In another example embodiment, the slicer 304 removes from the input buffer 302 initial segments representing media lasting 10 seconds. In another yet example embodiment, the slicer 304 removes from the input buffer 302 initial segments representing media lasting an amount of time configurable by an administrator.

In various circumstances, the client devices 110 may want to receive media data streams having different bit rates. For example, the client device 110A may want to receive a media data stream having a bit rate of three megabits per second, the client device 110B may want to receive a media data stream having a bit rate of 1.5 megabits per second, and the client device 110C may want to receive a media data stream having a bit rate of 800 kilobits per second. Different ones of the client devices 110 may want to receive media data streams having different bit rates for a variety of reasons. For example, the client device 110C may be a mobile telephone with a small screen and limited bandwidth. In this example, a media data stream having a bit rate of 800 kilobits per second would be sufficient to provide high-quality video, but higher bit rates may result in buffering delays. In another example, the client device 110A may be a high-definition television with a large screen and a broadband Internet connection. In this other example, receiving a media data stream having a bit rate of ten megabits per second may be desirable to provide high quality images.

Because different ones of the client devices 110 may want to receive media data streams having different bit rates, the media processing system 106 transcodes the initial media data stream to generate a plurality of transcoded media data streams. Each transcoded media data stream has a different bit rate. For instance, one of the transcoded media data streams has a bit rate of 1.5 megabits per second, another one of the transcoded media data streams has a bit rate of 1.0 megabits per second, yet another one of the transcoded media data streams has a bit rate of 700 kilobits per second, and so on.

In some instances, using different parameter sets to transcode an initial segment into transcoded segments having different bit rates results in the transcoded segments having higher similarity to the initial segment. For example, a transcoded segment having a given bit rate may have higher similarity to an initial segment when a first B-frame rate is used as opposed to when a second B-frame rate is used. In this example, a transcoded segment having another bit rate may have higher similarity to the initial segment when the second B-frame rate is used as opposed to the first B-frame rate.

Different ones of the parameter identification modules 306 generate parameter sets for use in transcoding the initial segment into transcoded segments having different bit rates. For example, the parameter identification module 306A may generate a parameter set for use in transcoding the initial segment into a transcoded segment having a bit rate of 2.0 megabits per second, the parameter identification module 306B may generate a parameter set for use in transcoding the initial segment into a transcoded segment having a bit rate of 1.7 megabits per second, and so on.

The parameter identification modules 306 perform iterative operations that select final parameter sets. Each iteration of the iterative operation generates at least one parameter set and transcodes an initial segment into a transcoded segment using the parameter set. In some example embodiments, the parameter identification modules 306 perform the iterative operation for each segment of the media data stream. In other example embodiments, the parameter identification modules 306 perform the iterative operation once for a media stream.

Figure 7:
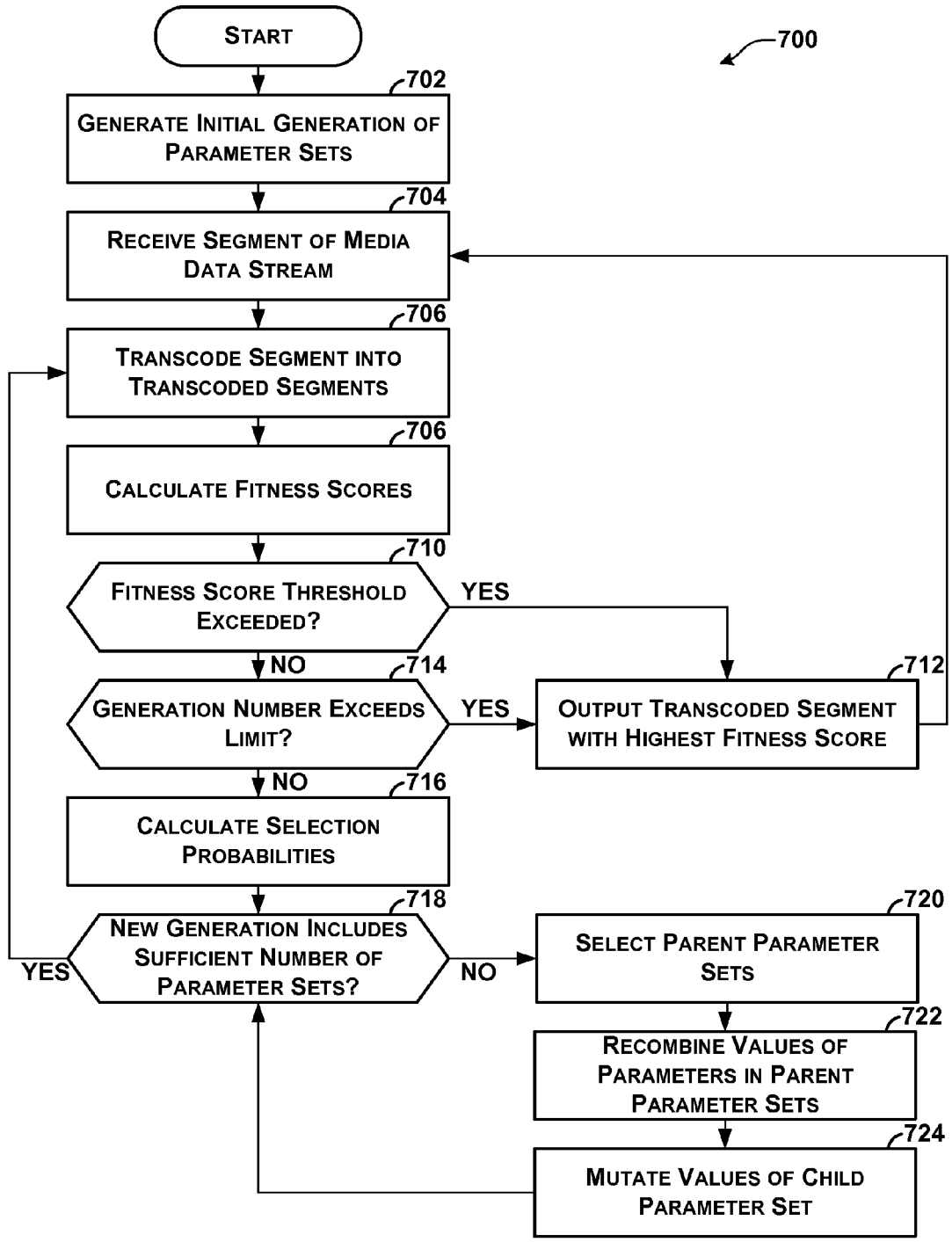
FIG. 7 is a flowchart illustrating an example operation for dynamically selecting a parameter set.

In different embodiments, the parameter identification modules 306 use different iterative operations. For instance, in some example embodiments, the parameter identification modules 306 use an iterative operation in which each iteration tends to generate parameter sets that produce transcoded segments having greater similarity to the initial segment. In other words, a transcoded segment generated by transcoding an initial segment using a parameter set generated by a given iteration of the iterative operation tends to have greater similarity to the initial segment than transcoded segments generated by transcoding the initial segment using parameter sets generated by iterations of the iterative operation occurring prior to the given iteration. For instance, the parameter identification modules 306 may use a genetic algorithm to generate the parameter sets. An example genetic algorithm to generate the parameter sets is illustrated in the example of FIG. 7. In other embodiments, the parameter identification modules 306 use an iterative operation in which there is no direct relationship between the similarity of the transcoded segments and the iterations.

The transcoders 308 use the parameter sets generated by the parameter identification modules 306 to transcode the initial segment into transcoded segments having different bit rates. For instance, the transcoder 308A uses one of the parameter sets to transcode the initial segment into a transcoded segment having a bit rate of 1.5 megabits per second, the transcoder 308B uses one of the parameter sets to transcode the initial segment into a transcoded segment having a bit rate of 1.0 megabits per second, and so on.

The transcoders 308 selectively store transcoded segments into corresponding ones of the output buffers 310. For instance, the transcoder 308A stores transcoded segments in the output buffer 310A, the transcoder 308B stores transcoded segments in the output buffer 310B, and so on.

In different embodiments, two or more of the transcoders 308 operate in parallel or in series. For instance, in the example of FIG. 3, each of the transcoders 308 operates in parallel. In another example embodiment, the media processing system 106 includes a single transcoder that sequentially transcodes the initial segment into transcoded segments having different bit rates. For instance, in this other example embodiment, the transcoder transcodes the initial segment into a transcoded segment having a bit rate of 1.5 megabits per second, then transcodes the initial segment into a transcoded segment having a bit rate of 1.0 megabits per second, and so on.

The server module 312 receives requests from the client devices 110 via the network 108. In some embodiments, the requests indicate the initial media data stream and a desired bit rate. In response to a request for the initial media data stream, the server module 312 transmits a media data stream comprising the transcoded segments in the one of the output buffers 310 storing transcoded segments having a bit rate indicated by the request.

In some instances, the initial media data stream is substantially live. In this patent document, a media data stream is substantially live when the media data stream comprises media data representing events that are currently occurring or have occurred a short time before the initial media data stream is transmitted. Example time delays range from 0 to 300 seconds after the events. In some embodiments, the media processing system 106 transcodes the initial media data stream into transcoded media data streams such that the transcoded media data streams are substantially live. In other words, the transcoded media data streams comprise media data representing events that are currently occurring or have occurred a short time before the initial media data stream is transmitted.

Figure 4:
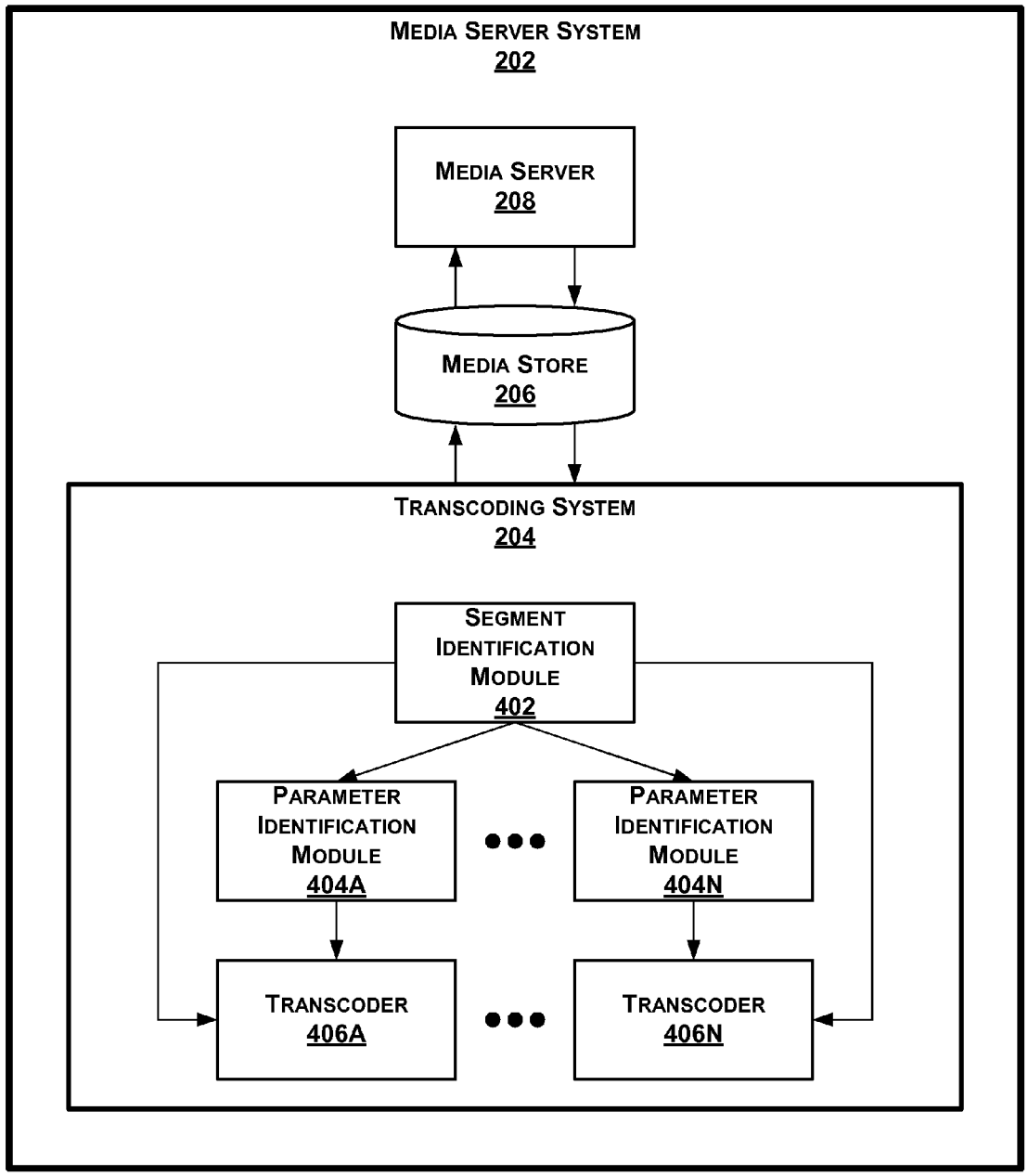
FIG. 4 is a block diagram illustrating example logical components of a media server system.

FIG. 4 is a block diagram illustrating example logical components of the media server system 202. The example of FIG. 4 is explained with reference to FIG. 2. It should be appreciated that in some embodiments, the media server system 202 illustrated in the example of FIG. 4 may be included in media distribution systems other than that illustrated in the example of FIG. 2.

In the example of FIG. 4, the media server system 202 comprises the transcoding system 204, the media store 206, and the media server 208. The transcoding system 204, the media store 206, and the media server 208 are similar in function and implementation to the transcoding system 204, the media store 206, and the media server 208 illustrated in the example of FIG. 2. It should be appreciated that in other embodiments, the media server system 202 includes different logical components.

As illustrated in the example of FIG. 4, the transcoding system 204 comprises a segment identification module 402, parameter identification modules 404A-404N (collectively, "parameter identification module 404"), and transcoders 406A-406N (collectively, "transcoders 406"). In various embodiments, the segment identification module 402, the parameter identification modules 404, and the transcoders 406 are implemented in various ways. For instance, in one example embodiment, the segment identification module 402, the parameter identification modules 404, and/or the transcoders 406 are implemented as sets of software instructions that, when executed by a processing unit of the media server system 202, cause the media server system 202 to provide the functionality of the segment identification module 402, the parameter identification modules 404, and the transcoders 406. In another example embodiment, the segment identification module 402, the parameter identification modules 404, and/or the transcoders 406 are implemented using one or more ASICs that cause the media server system 202 to provide the functionality of the segment identification module 402, the parameter identification modules 404, and the transcoders 406.

The segment identification module 402 identifies a representative segment of an initial media data stream in a media file stored in the media store 206. In different embodiments, the segment identification module 402 identifies the representative segment of the initial media data stream in different ways. For instance, in one example embodiment, the segment identification module 402 identifies a busiest segment of the initial media data stream. The busiest segment of a video data stream is a segment of the video file with the greatest change from one frame to the next frame. A technique for identifying the busiest segment of the initial media data stream is described in U.S. provisional patent applications 61/119,854 and 61/182,945, the entire disclosures of which are hereby incorporated by reference. In another example embodiment, the segment identification module 402 identifies a segment of the initial media data stream of average busyness.

Furthermore, in different embodiments, the segment identification module 402 identifies representative segments that represent media lasting different amounts of time. For instance, in one example embodiment, the segment identification module 402 identifies a representative segment that represents media lasting five seconds. In another example embodiment, the segment identification module 402 identifies a representative segment that represents media lasting one second.

After the segment identification module 402 identifies the representative segment of the initial media data stream, different ones of the parameter identification modules 404 use iterative operations to select final parameter sets for use in transcoding the initial media data stream into transcoded media data streams having different bit rates. For instance, the parameter identification module 404A may use an iterative operation to select a final parameter set for use in transcoding the initial media data stream into a transcoded media data stream having a bit rate of 1.5 megabits per second, the parameter identification module 404B may use the iterative operation to select a final parameter set for use in transcoding the initial media data stream into a transcoded media data stream having a bit rate of 1.0 megabits per second, and so on.

The parameter identification modules 404 use an iterative operation to select final parameter sets. Each iteration of the iterative operation generates one or more parameter sets and transcodes the representative segment using the one or more parameter sets. In different embodiments, the parameter identification modules 404 use different iterative operations to select the final parameter sets. For instance, in one example embodiment, the parameter identification modules 404 use the iterative operations described with reference to FIGS. 8-10 to select final parameter sets. In other embodiments, the parameter identification modules 404 use other genetic algorithms, neural network algorithms, iterative value replacement algorithms, and other types of iterative operations.

In different embodiments, two or more of the parameter identification modules 404 operate in parallel or in series. For instance, in the example of FIG. 4, each of the parameter identification modules 404 operates in parallel. In another example, the media server system 202 includes a single parameter identification module that generates parameter sets in sequence. For instance, in this other example embodiment, the parameter identification module generates a parameter set for use in transcoding the initial media data stream into a transcoded media data stream having a bit rate of 1.5 megabits per second, then generates a parameter set for use in transcoding the initial media data stream into a transcoded media data stream having a bit rate of 1.0 megabits per second, and so on.

The transcoders 406 use the final parameter sets selected by the parameter identification modules 404 to transcode the initial media data stream into transcoded media data streams having different bit rates. For instance, the transcoder 406A uses one of the final parameter sets to transcode the initial media data stream into a transcoded media data stream having a bit rate of 1.5 megabits per second, the transcoder 406B uses one of the final parameter sets to transcode the initial media data stream into a transcoded media data stream having a bit rate of 1.0 megabits per second, and so on. When the transcoders 406 generate the transcoded media data streams, the transcoders 406 store the transcoded media data streams in the media store 206.

In different embodiments, two or more of the transcoders 406 operate in parallel or in series. For instance, in the example of FIG. 4, each of the transcoders 406 operates in parallel. In another example, the media server system 202 comprises a transcoder that transcodes the initial media data stream into transcoded media data streams in sequence. For instance, in this other example, the transcoder transcodes the initial media data stream into a transcoded media file having a bit rate of 1.5 megabits per second, then transcodes the initial media data stream into a transcoded media data stream having a bit rate of 1.0 megabits per second, and so on.

As discussed elsewhere in this patent document, the media server 208 receives requests from the client devices 110 via the network 108. In response to the requests, the media server 208 retrieves transcoded media data streams from the media store 206 and transmits the transcoded media data streams to the client devices 110 via the network 108.

Figure 5:
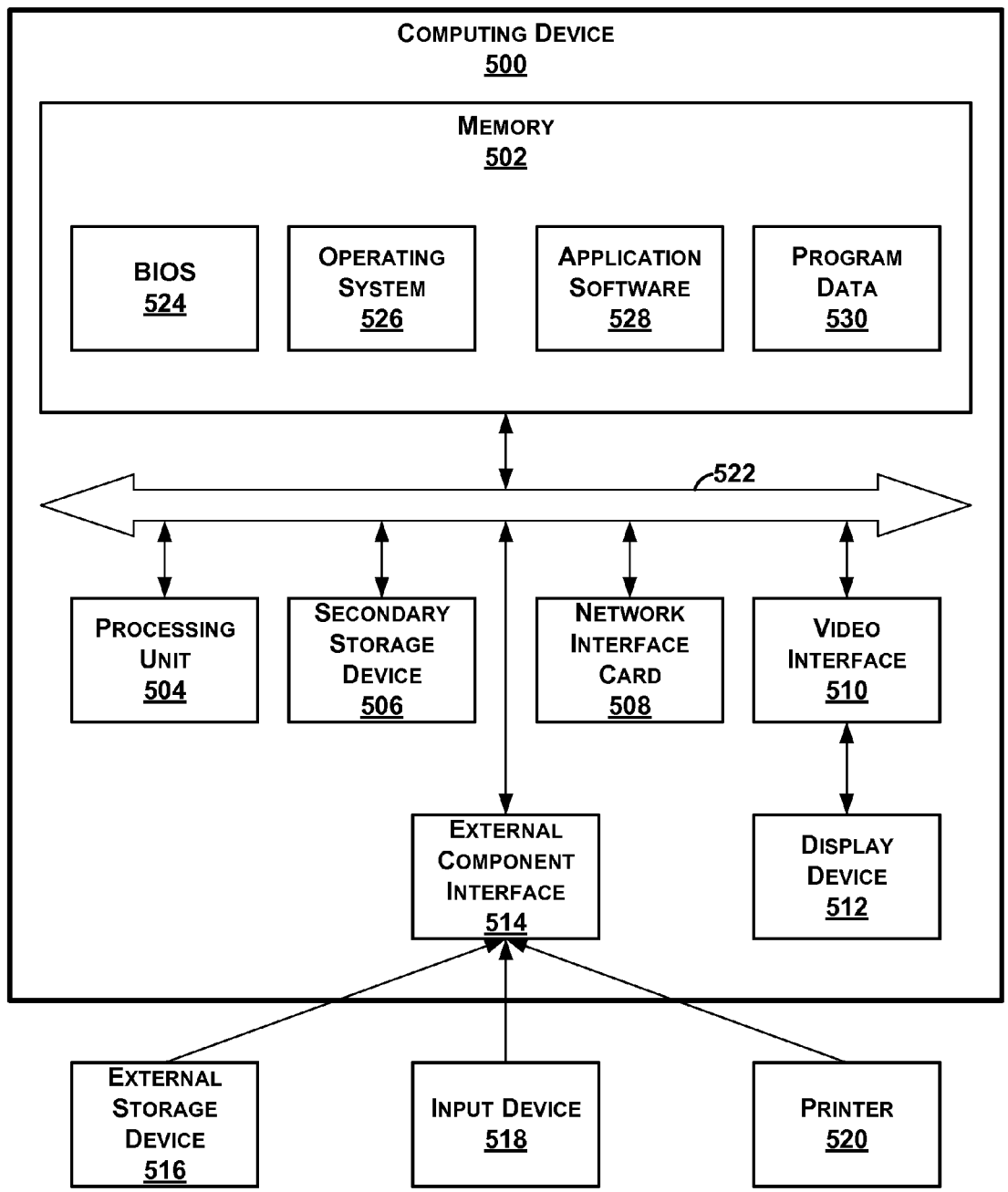
FIG. 5 is a block diagram illustrating example hardware components of a computing device.

FIG. 5 is a block diagram illustrating example hardware components of a computing device 500. In some embodiments, the media processing system 106, the client devices 110, and/or the media server system 202, are implemented using one or more computing devices like the computing device 500. It should be appreciated that in other embodiments, the media processing system 106, the client devices 110, and/or the media server system 202 are implemented using computing devices having hardware components other than those illustrated in the example of FIG. 5.

In different embodiments, computing devices are implemented in different ways. For instance, in the example of FIG. 5, the computing device 500 comprises a memory 502, a processing unit 504, a secondary storage device 506, a network interface card 508, a video interface 510, a display device 512, an external component interface 514, an external storage device 516, an input device 518, a printer 520, and a communication medium 522. In other embodiments, computing devices are implemented using more or fewer hardware components. For instance, in another example embodiment, a computing device does not include a video interface, a display device, an external storage device, or an input device.

The memory 502 includes one or more computer-readable data storage media capable of storing data and/or instructions. In different embodiments, the memory 502 is implemented in different ways. For instance, in various embodiments, the memory 502 is implemented using various types of computer-readable data storage media. Example types of computer-readable data storage media include, but are not limited to, dynamic random access memory (DRAM), double data rate synchronous dynamic random access memory (DDR SDRAM), reduced latency DRAM, DDR2 SDRAM, DDR3 SDRAM, Rambus RAM, solid state memory, flash memory, read-only memory (ROM), electrically-erasable programmable ROM, and other types of devices and/or articles of manufacture that store data.

The processing unit 504 includes one or more physical integrated circuits that selectively execute software instructions. In various embodiments, the processing unit 504 is implemented in various ways. For instance, in one example embodiment, the processing unit 504 is implemented as one or more processing cores. For instance, in this example embodiment, the processing unit 504 may be implemented as one or more Intel Core 2 microprocessors. In another example embodiment, the processing unit 504 is implemented as one or more separate microprocessors. In yet another example embodiment, the processing unit 504 is implemented as an ASIC that provides specific functionality. In yet another example embodiment, the processing unit 504 provides specific functionality by using an ASIC and by executing software instructions.

In different embodiments, the processing unit 504 executes software instructions in different instruction sets. For instance, in various embodiments, the processing unit 504 executes software instructions in instruction sets such as the x86 instruction set, the POWER instruction set, a RISC instruction set, the SPARC instruction set, the IA-64 instruction set, the MIPS instruction set, and/or other instruction sets.

The secondary storage device 506 includes one or more computer-readable data storage media. The secondary storage device 506 stores data and software instructions not directly accessible by the processing unit 504. In other words, the processing unit 504 performs an I/O operation to retrieve data and/or software instructions from the secondary storage device 506. In various embodiments, the secondary storage device 506 is implemented by various types of computer-readable data storage media. For instance, the secondary storage device 506 may be implemented by one or more magnetic disks, magnetic tape drives, CD-ROM discs, DVD-ROM discs, Blu-Ray discs, solid state memory devices, Bernoulli cartridges, and/or other types of computer-readable data storage media.

The network interface card 508 enables the computing device 500 to send data to and receive data from a computer communication network. In different embodiments, the network interface card 508 is implemented in different ways. For example, in various embodiments, the network interface card 508 is implemented as an Ethernet interface, a token-ring network interface, a fiber optic network interface, a wireless network interface (e.g., WiFi, WiMax, etc.), or another type of network interface.

The video interface 510 enables the computing device 500 to output video information to the display device 512. In different embodiments, the video interface 510 is implemented in different ways. For instance, in one example embodiment, the video interface 510 is integrated into a motherboard of the computing device 500. In another example embodiment, the video interface 510 is a video expansion card. Example types of video expansion cards include Radeon graphics cards manufactured by ATI Technologies, Inc. of Markham, Ontario, Geforce graphics cards manufactured by Nvidia Corporation of Santa Clara, Calif., and other types of graphics cards.

In various embodiments, the display device 512 is implemented as various types of display devices. Example types of display devices include, but are not limited to, cathode-ray tube displays, LCD display panels, plasma screen display panels, touch-sensitive display panels, LED screens, projectors, and other types of display devices. In various embodiments, the video interface 510 communicates with the display device 512 in various ways. For instance, in various embodiments, the video interface 510 communicates with the display device 512 via a Universal Serial Bus (USB) connector, a VGA connector, a digital visual interface (DVI) connector, an S-Video connector, a High-Definition Multimedia Interface (HDMI) interface, a DisplayPort connector, or other types of connectors.

The external component interface 514 enables the computing device 500 to communicate with external devices. In various embodiments, the external component interface 514 is implemented in different ways. For instance, in one example embodiment, the external component interface 514 is a USB interface. In other example embodiments, the computing device 500 is a FireWire interface, a serial port interface, a parallel port interface, a PS/2 interface, and/or another type of interface that enables the computing device 500 to communicate with external components.

In different embodiments, the external component interface 514 enables the computing device 500 to communicate with different external components. For instance, in the example of FIG. 5, the external component interface 514 enables the computing device 500 to communicate with the external storage device 516, the input device 518, and the printer 520. In other embodiments, the external component interface 514 enables the computing device 500 to communicate with more or fewer external components. Other example types of external components include, but are not limited to, speakers, phone charging jacks, modems, media player docks, other computing devices, scanners, digital cameras, a fingerprint reader, and other devices that can be connected to the computing device 500.

The external storage device 516 is an external component comprising one or more computer readable data storage media. Different implementations of the computing device 500 interface with different types of external storage devices. Example types of external storage devices include, but are not limited to, magnetic tape drives, flash memory modules, magnetic disk drives, optical disc drives, flash memory units, zip disk drives, optical jukeboxes, and other types of devices comprising one or more computer-readable data storage media. The input device 518 is an external component that provides user input to the computing device 500. Different implementations of the computing device 500 interface with different types of input devices. Example types of input devices include, but are not limited to, keyboards, mice, trackballs, stylus input devices, key pads, microphones, joysticks, touch-sensitive display screens, and other types of devices that provide user input to the computing device 500. The printer 520 is an external device that prints data to paper. Different implementations of the computing device 500 interface with different types of printers. Example types of printers include, but are not limited to laser printers, ink jet printers, photo printers, copy machines, fax machines, receipt printers, dot matrix printers, or other types of devices that print data to paper.

The communications medium 522 facilitates communication among the hardware components of the computing device 500. In different embodiments, the communications medium 522 facilitates communication among different components of the computing device 500. For instance, in the example of FIG. 5, the communications medium 522 facilitates communication among the memory 502, the processing unit 504, the secondary storage device 506, the network interface card 508, the video interface 510, and the external component interface 514. In different implementations of the computing device 500, the communications medium 522 is implemented in different ways. For instance, in different implementations of the computing device 500, the communications medium 522 may be implemented as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computer System Interface (SCSI) interface, or another type of communications medium.

The memory 502 stores various types of data and/or software instructions. For instance, in the example of FIG. 5, the memory 502 stores a Basic Input/Output System (BIOS) 524, an operating system 526, application software 528, and program data 530. The BIOS 524 includes a set of software instructions that, when executed by the processing unit 504, cause the computing device 500 to boot up. The operating system 526 includes a set of software instructions that, when executed by the processing unit 504, cause the computing device 500 to provide an operating system that coordinates the activities and sharing of resources of the computing device 500. Example types of operating systems include, but are not limited to, Microsoft Windows, Linux, Unix, Apple OS X, Apple OS X iPhone, Palm webOS, Palm OS, Google Chrome OS, Google Android OS, and so on. The application software 528 includes a set of software instructions that, when executed by the processing unit 504, cause the computing device 500 to provide applications to a user of the computing device 500. The program data 530 is data generated and/or used by the application software 528.

Figure 6:
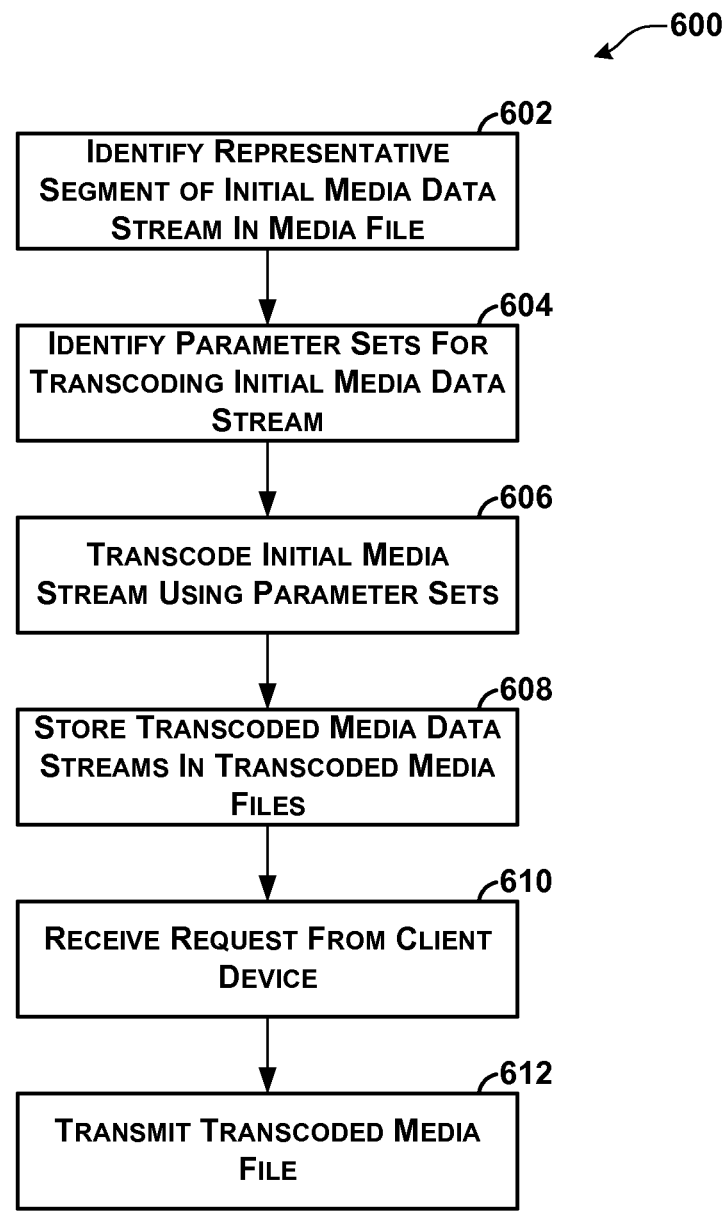
FIG. 6 is a flowchart illustrating an example operation of the media server system.

FIG. 6 is a flowchart illustrating an example operation 600 of the media server system 202. In other embodiments, operations of the media server system 202 may involve more or fewer steps, or may involve the steps of the operation 600 in a different order. Furthermore, the operation 600 is explained with reference to other figures in this patent document. It should be appreciated that other operations of the media server system 202 may be used in systems and devices other than those illustrated in the figures of this patent document.

As illustrated in the example of FIG. 6, the operation 600 starts when the segment identification module 402 identifies a representative segment of an initial media data stream in a media file stored in the media store 206 (602). As discussed elsewhere in this patent document, different implementations of the segment identification module 402 use different techniques to identify the representative segment of the initial media data stream.

After the segment identification module 402 identifies the representative segment of the initial media data stream, the parameter identification modules 306 use the representative sample to select final parameter sets (604). As described elsewhere in this patent document, different implementations of the parameter identification modules 306 use a variety of different iterative operations to select final parameter sets.

When the parameter identification modules 306 select the final parameter sets, the transcoders 308 transcode the initial media data stream into one or more transcoded media data streams using the final parameter sets (606). The transcoders 308 store the transcoded media data streams in media files in the media store 206 (608).

Subsequently, the server module 312 receives a request from one of the client devices 110 (610). In response to the request, the server module 312 retrieves one of the transcoded media files from the media store 206 having an appropriate bit rate and sends the transcoded media file to the client device via the network 108 (612). As discussed elsewhere in this patent document, different implementations of the server module 312 send the transcoded media file to the client device in different ways. Furthermore, as discussed elsewhere in this patent document, the server module 112 may send the transcoded media file to the client device in different ways in response to different types of requests.

FIG. 7 is a flowchart illustrating an example operation 700 for dynamically selecting a parameter set. It should be appreciated that other embodiments may use iterative operations that involve more or fewer steps, or may involve the steps of the operation 700 in a different order. Furthermore, the operation 700 is explained with reference to other figures in this patent document. It should be appreciated that other operations to generate parameter sets may be used in systems, devices, and operations other than those illustrated in the figures of this patent document.

For ease of explanation, this patent document describes the operation 700 as being performed by the parameter identification module 306 with regard to an initial segment of an initial media data stream. However, the operation 700 may be performed by the parameter identification modules 404 with regard to a representative segment of a media data stream in a media file.

The operation 700 is an instance of a genetic algorithm that selects an individual final parameter set for each segment in an initial media data stream. Each segment in the initial media data stream is transcoded during the operation 700 using the final parameter set for the initial segment. Because the operation 700 selects a final parameter set for each segment in the initial media data stream, each segment in the initial media data stream may be transcoded using a different parameter set.

The operation 700 starts when the parameter identification module 306 generates an initial generation of parameter sets (702). Each parameter set in the initial generation of parameter sets includes at least some of the encoding parameters used by the transcoders 308.

In different embodiments, the initial generation of parameter sets includes different numbers of parameter sets. For instance, in one example embodiment, the initial generation of parameter sets contains one hundred parameter sets. In another example embodiment, the initial generation of parameter sets includes sixty-four parameter sets.

In different embodiments, the parameter identification module 306 generates the initial generation of parameter sets in different ways. For instance, in one example embodiment, the parameter identification module 306 generates each parameter set in the initial population of parameter sets by randomly selecting values of the encoding parameters in the parameter sets. In another example embodiment, the parameter identification module 306 generates each parameter set in the initial population of parameter sets by selecting values of the encoding parameters in the parameter sets based in part on values of encoding parameters in a parameter set used to transcode a previous segment of an initial media data stream.

Next, the transcoder 308 receives a segment of a media data stream (704). For purposes of explanation, this patent document refers to this segment as the current segment. Upon receiving the current segment of the media data stream, the transcoder 308 uses the parameter sets in the current generation of parameter sets to transcode the current segment into a plurality of transcoded segments (706). In one example embodiment, the transcoder 308 generates a transcoded segment based on each of the parameter sets in the current generation. In another example embodiment, the transcoder 308 determines whether any of the parameter sets in the current generation are the same. In this other example embodiment, the transcoder 308 generates a transcoded segment based on each unique parameter set in the current generation. For instance, if the current generation includes two or more identical parameter sets, the transcoder 308 only generates one transcoded segment based on the two or more identical parameter sets.

The parameter identification module 306 uses the transcoded segments to calculate fitness scores for each parameter set in the current generation of parameter sets (708). A transcoded segment that has higher similarity to the current segment has a greater fitness score than a transcoded segment that has lower similarity to the current segment. In other words, higher fitness scores correspond to higher similarity.

In different embodiments, the parameter identification module 306 calculates the fitness scores for parameter sets in different ways. For instance, in one example embodiment, the parameter identification module 306 calculates the fitness scores by performing a structural similarity test. The structural similarity test compares video frames represented by the current segment and corresponding video frames represented by a transcoded segment. In this example embodiment, the fitness score of a parameter set is higher when frames represented by the current segment are more similar to the frames represented by the transcoded segment. In another example embodiment, the parameter identification module 306 calculates the fitness scores by calculating a peak signal-to-noise ratio (PSNR) for each of the transcoded segments. In yet another example embodiment, the parameter identification module 306 calculates the fitness scores by calculating a perceptual evaluation of video quality (PEVQ) score for each of the transcoded segments.

After the parameter identification module 306 calculates the fitness scores for parameter sets in the current generation, the parameter identification module 306 determines whether any of the fitness scores exceed a fitness score threshold (710). Various embodiments use various fitness score thresholds. For instance, in one example embodiment, when the parameter identification module 306 calculates the fitness scores using a structural similarity test, the fitness scores range from 0 to 1. In this example embodiment, the parameter identification module 306 may determine that a fitness score exceeds the fitness score threshold when the fitness score is above 0.98. Furthermore, in embodiments where the parameter identification module 306 calculates the fitness scores using a structural similarity test, the fitness score threshold may vary depending on the bit rate and/or size of the transcoded segments. For instance, if the current segment has a bit rate of 10 megabits per second and represents video frames of size 1920×1080 (i.e., 1920 pixels wide and 1080 pixels high) and the transcoded segment has a bit rate of 800 kilobits per second and represents video frames of size 720× 480, the fitness score threshold may be 0.95.

In different embodiments, the parameter identification module 306 uses different fitness score thresholds for different purposes. For instance, in one example embodiment, the parameter identification module 306 uses a relatively low fitness score threshold in order to identify a parameter set relatively quickly. In other example embodiments, the parameter identification module 306 uses a relatively high fitness score threshold in order to increase the chances of identifying a parameter set that produces a transcoded version of the media data having relatively high similarity to the original version of the media data.

If the parameter identification module 306 determines that any of the fitness scores exceeds the fitness score threshold ("YES" of 710), the parameter identification module 306 outputs to the output buffer 310 the transcoded segment having the highest fitness score (712). In one example embodiment, the parameter identification module 306 outputs the transcoded segment having a greatest fitness score in any generation of parameter sets. In another example embodiment, the parameter identification module 306 outputs the transcoded segment having a greatest fitness score in the most recent generation of parameter sets. In this way, if the parameter identification module 306 is able to generate a parameter set for producing a transcoded segment having high enough similarity to the current segment, the parameter identification module 306 does not invest additional computing resources performing the operation 700 in an attempt to find a parameter set for producing a transcoded segment with even higher similarity to the current segment.

If the parameter identification module 306 determines that none of the fitness scores exceeds the fitness score threshold ("NO" of 710), the parameter identification module 306 determines whether a generation number exceeds a generation limit (714). The generation limit indicates a maximum number of generations that can occur before the parameter identification module 306 outputs a transcoded segment. In different embodiments, the generation limit has different values. For instance, in one example embodiment, the generation limit is one hundred generations. In another example embodiment, the generation limit is twenty generations. A greater generation limit may result in greater computation time, but may be more likely to identify parameter sets having higher fitness scores. If the parameter identification module 306 determines that the generation number exceeds the generation limit ("YES" of 714), the parameter identification module 306 outputs to the output buffer 310 the transcoded segment having the highest fitness score (712). The parameter identification module 306 then receives another segment of the media data stream (704), and the operation 700 recurs. The other segment of the media data stream is the new current segment.

If the parameter identification module 306 determines that the generation number does not exceed the generation limit ("NO" of 714), the parameter identification module 306 calculates selection probabilities for each parameter set in the current generation (716). The selection probability of a parameter set is proportional to the fitness score of the parameter set. In other words, a parameter set with a higher fitness score has a higher selection probability than a parameter set with a lower fitness score.

After calculating the selection probabilities for each of the parameters sets, the parameter identification module 306 determines whether a new generation of parameter sets includes a sufficient number of parameter sets (718). If the new generation of parameter sets does not include a sufficient number of parameter sets ("NO" of 718), the parameter identification module 306 selects parent parameter sets based on the selection probabilities of the parameter sets (720). For example, if a parameter set has a selection probability of 0.25, there is a 25% chance that the parameter identification module 306 selects the parameter set to be a parent parameter set. Because the selection probabilities of the parameter sets are based on the fitness scores of the parameter sets, the parameter identification module 306 is more likely to select parameter sets having relatively high fitness scores to be parent parameter sets.

In different embodiments, the parameter identification module 306 selects different numbers of parent parameter sets. For instance, in one example embodiment, the parameter identification module 306 selects two parent parameter sets. In another example embodiment, the parameter identification module 306 selects three parent parameter sets.

After selecting the parent parameter sets, the parameter identification module 306 generates a child parameter set by recombining the values of the encoding parameters in the parent parameter sets (722). Each of the encoding parameters in the child parameter set has a value equal to the value of the corresponding encoding parameter in one of the parent parameter sets. For example, the value of an encoding parameter in a first parent parameter set is "20" and the value of the encoding parameter in a second parent parameter set is "30." In this example, the value of the encoding parameter in the child parameter set is either "20" or "30." In this way, the parameter identification module 306 recombines the values of encoding parameters in the parent parameter sets to generate the values of the encoding parameters in the child parameter set.

After generating the child parameter set, the parameter identification module 306 mutates values of encoding parameters in the child parameter set (724). The parameter identification module 306 mutates values of parameters at a rate governed by a mutation rate. The mutation rate indicates a probability that a given encoding parameter will be assigned a different value. For example, if the mutation rate is 0.005, there is a 0.005 probability that the parameter identification module 306 will assign a different value to a given encoding parameter in the child parameter set. In different embodiments, the parameter identification module 306 uses different mutation rates. It should be appreciated that some embodiments do not mutate the values of encoding parameters in the child parameter set. In other words, in such embodiments the mutation rate is zero.

After mutating the values of encoding parameters in the child parameter set, the parameter identification module 306 again determines whether the new generation of parameter sets includes a sufficient number of parameter sets (718). If the parameter identification module 306 determines that the new generation of parameter sets does not include a sufficient number of parameter sets ("NO" of 718), the parameter identification module 306 generates another child parameter set by performing steps 720, 722, and 724. In this way, the parameter identification module 306 continues generating child parameter sets until the new generation of parameter sets includes a sufficient number of parameter sets.

If the parameter identification module 306 determines that the new generation includes a sufficient number of parameter sets ("YES" of 718), the new generation of parameter sets becomes the current generation of parameter sets and a new iteration of the operation 700 begins. In other words, if the parameter identification module 306 determines that the new generation of parameter sets includes a sufficient number of parameter sets ("YES" of 718), the parameter identification module 306 uses each of the parameter sets in the new current generation to transcode the current segment into transcoded segments (806). The parameter identification module 306 then performs steps 808-824 until the parameter identification module 306 outputs a transcoded version of the current segment to the output buffer 310.

Figure 8:
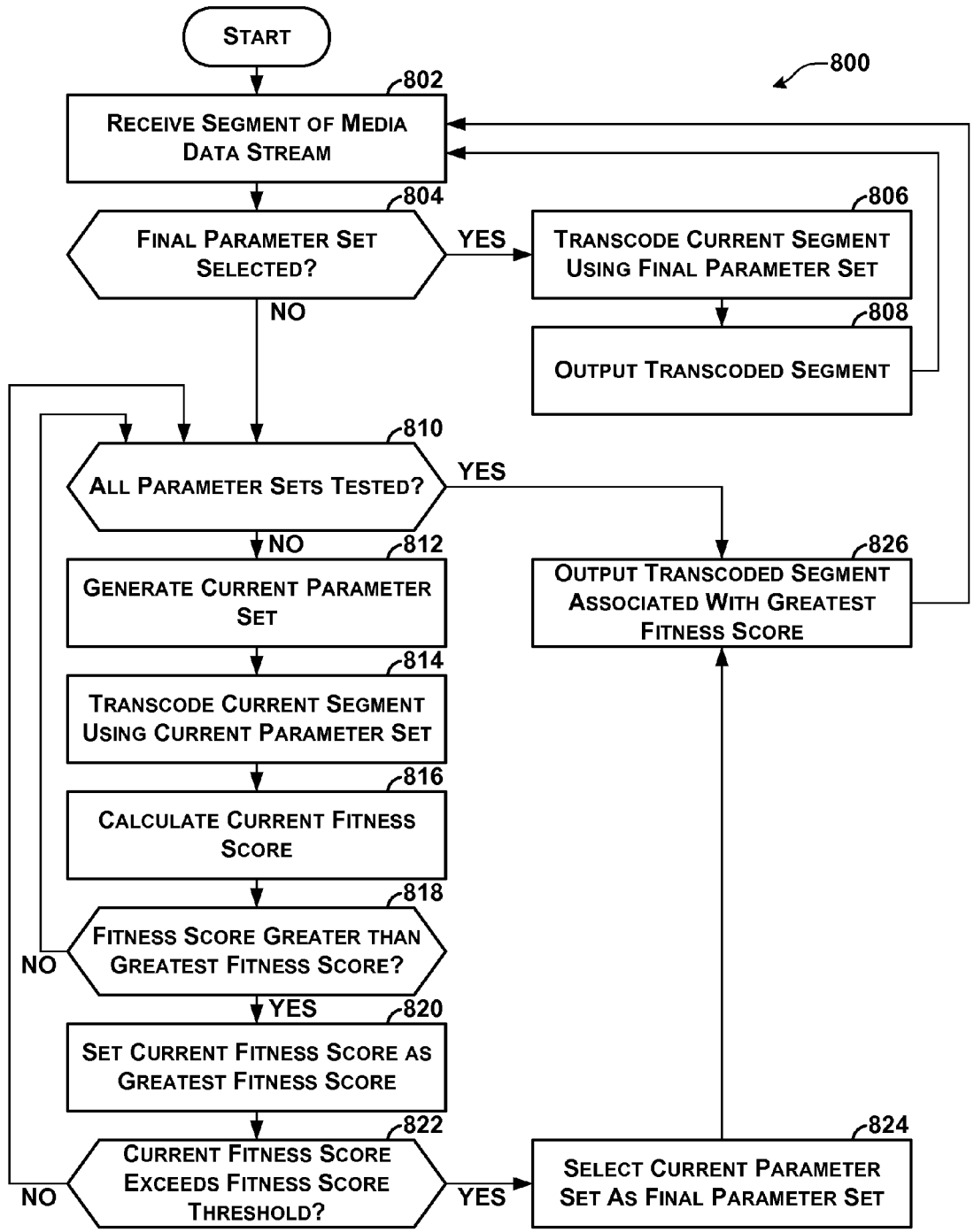
FIG. 8 is a flowchart illustrating another example operation for dynamically selecting a parameter set.

FIG. 8 is a flowchart illustrating another example operation 800 for dynamically selecting a parameter set. It should be appreciated that other embodiments may use operations that involve more or fewer steps, or may involve the steps of the iterative operation 800 in a different order. Furthermore, the operation 800 is explained with reference to other figures in this patent document. It should be appreciated that other operations to generate parameter sets may be used in systems, devices, and operations other than those illustrated in the figures of this patent document.

The operation 800 is selects a final parameter set for an entire media data stream. As illustrated in the example of FIG. 8, the operation 800 starts when the parameter identification module 306 receives a segment of a media data stream (802). For purposes of explanation, this patent document refers to this segment as the current segment. The parameter identification module 306 then determines whether a final parameter set has been selected (804). If the final parameter set has been selected ("YES" of 804), transcoder 308 transcodes the current segment into a transcoded segment using the final parameter set (806). The parameter identification module 306 then outputs the transcoded segment to the output buffer 310 (808).

On the other hand, if the final parameter set has not yet been selected ("NO" of 804), the parameter identification module 306 determines whether all possible parameter sets have been tested for the current segment (810). In other words, the parameter identification module 306 determines whether each combination of values of encoding parameters has been tested for tested for the current segment.

If one or more of the possible parameter sets have not been tested for the current segment ("NO" of 810), the parameter identification module 306 generates a parameter set that has not been tested for the current segment (812). For ease of explanation, this patent document refers to this parameter set as "the current parameter set." After the parameter identification module 306 generates the current parameter set, the transcoder 308 transcodes the current segment using the current parameter set (814). The parameter identification module 306 then calculates a fitness score for the transcoded version of the current segment (816). The current fitness score is a measure of the similarity between the segment and the transcoded version of the segment. In various embodiments, the parameter identification module 306 may use any of the techniques for calculating the fitness score discussed above with reference to FIG. 7.

After the parameter identification module 306 calculates the fitness score for the transcoded version of the current segment, the parameter identification module 306 determines whether the fitness score for the transcoded version of the current segment is greater than a greatest previously seen fitness score for the current segment (818). For ease of explanation, this patent disclosure document refers to the fitness score for the transcoded version of the current segment as the current fitness score. If the current fitness score is greater than the greatest previously seen fitness score for the current segment ("YES" of 818), the parameter identification module 306 sets the current fitness score as the greatest previously seen fitness score for the current segment (820).

Next, the parameter identification module 306 determines whether the current fitness score exceeds a fitness score threshold (822). If the current fitness score does not exceed the fitness score threshold ("NO" of 822), the parameter identification module 306 determines again whether all possible parameter sets for the current segment have been tested (810), and so on.

If the current fitness score exceeds the fitness score threshold ("YES" of 822), the parameter identification module 306 selects the current parameter set as the final parameter set (828). After selecting the current parameter set as the final parameter set or after determining that all parameter sets have been tested for the current segment ("YES" of 810), the parameter identification module 306 outputs the transcoded version of the current segment having the greatest fitness score (826). After outputting the transcoded version of the segment having the greatest fitness score, the parameter identification module 306 receives another segment in the media data stream (802), and the operation 800 repeats on this other segment. The operation 800 may recur until a last segment of the media data stream.

Figure 9:
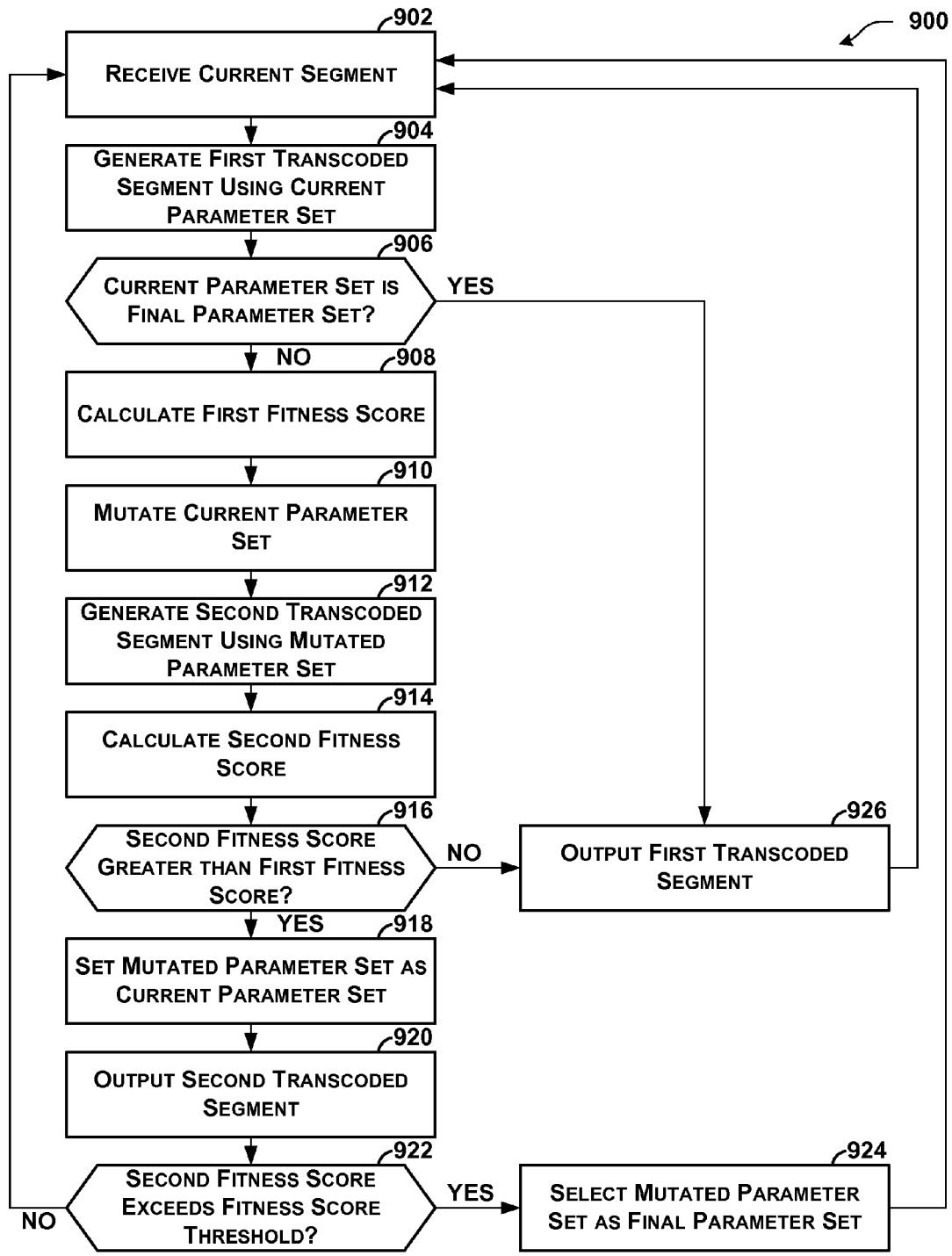
FIG. 9 is a flowchart illustrating yet another example operation for dynamically selecting a parameter set.

FIG. 9 is a flowchart illustrating yet another example operation for dynamically selecting a parameter set. It should be appreciated that other embodiments may use iterative operations that involve more or fewer steps, or may involve the steps of the operation 900 in a different order. Furthermore, the operation 900 is explained with reference to other figures in this patent document. It should be appreciated that other operations to generate parameter sets may be used in systems, devices, and operations other than those illustrated in the figures of this patent document.

As illustrated in the example of FIG. 9, the operation 900 begins when the parameter identification module 306 receives a segment in a media data stream (902). For ease of explanation, this patent document refers to this segment as the current segment. After receiving the current segment, the parameter identification module 306 generates a first transcoded segment using a current parameter set (904). In some embodiments, the current parameter set is a parameter set used to encode an immediately previous segment of the media data stream. The parameter identification module 306 then determines whether the current parameter set is the final parameter set (906).

If the parameter identification module 306 determines that the current parameter set is not the final parameter set ("NO" of 906), the parameter identification module 306 calculates a fitness score for the first transcoded segment (908). In various embodiments, the parameter identification module 306 may use any of the techniques for calculating the fitness score discussed above with reference to FIG. 7. The parameter identification module 306 then generates a mutated parameter set by mutating the current parameter set (910). In other words, the parameter identification module 306 generates a new parameter set by randomly changing values of encoding parameters in the current parameter set at a given rate. For instance, the parameter identification module 306 may generate a new parameter set by randomly changing values of encoding parameters in the current parameter set at a rate of 0.05. In other words, for any given encoding parameter in the current parameter set, there is a 5% chance that the parameter identification module 306 will change the value of the given encoding parameter.

After generating the mutated parameter set, the transcoder 308 generates a second transcoded segment by transcoding the current segment using the mutated parameter set (912). The parameter identification module 306 then calculates a fitness score for the second transcoded segment (914). For ease of explanation, this patent document refers to the fitness score for the second transcoded segment as the second fitness score.

After calculating the second fitness score, the parameter identification module 306 determines whether the second fitness score is greater than the first fitness score (916). If the second fitness score is greater than the first fitness score ("YES" of 916), the parameter identification module 306 sets the mutated parameter set as the current parameter set (918). In this way, the mutated parameter set is used in subsequent iterations of the operation 900 instead of the parameter set that had been the current parameter set.

The parameter identification module 306 then outputs the second transcoded segment to the output buffer 310 (920). The parameter identification module 306 then determines whether the second fitness score exceeds a fitness score threshold (922). If the second fitness score exceeds the fitness score threshold ("YES" of 922), the parameter identification module 306 selects the mutated parameter set as the final parameter set (924). After the parameter identification module 306 selects the mutated parameter set as the final parameter set or after the parameter identification module 306 determines that the second fitness score does not exceed the fitness score threshold ("NO" of 922), the parameter identification module 306 receives another segment of the media data stream (902), and the operation 900 recurs.

If the second fitness score is not greater than the first fitness score ("NO" of 916) or if the current parameter set is the final parameter set ("YES" of 906), the parameter identification module 306 outputs the first transcoded segment to the output buffer 310 (926). After outputting the first transcoded segment, the parameter identification module 306 receives another segment in the media data stream (902), and the operation 900 recurs.

Figure 10:
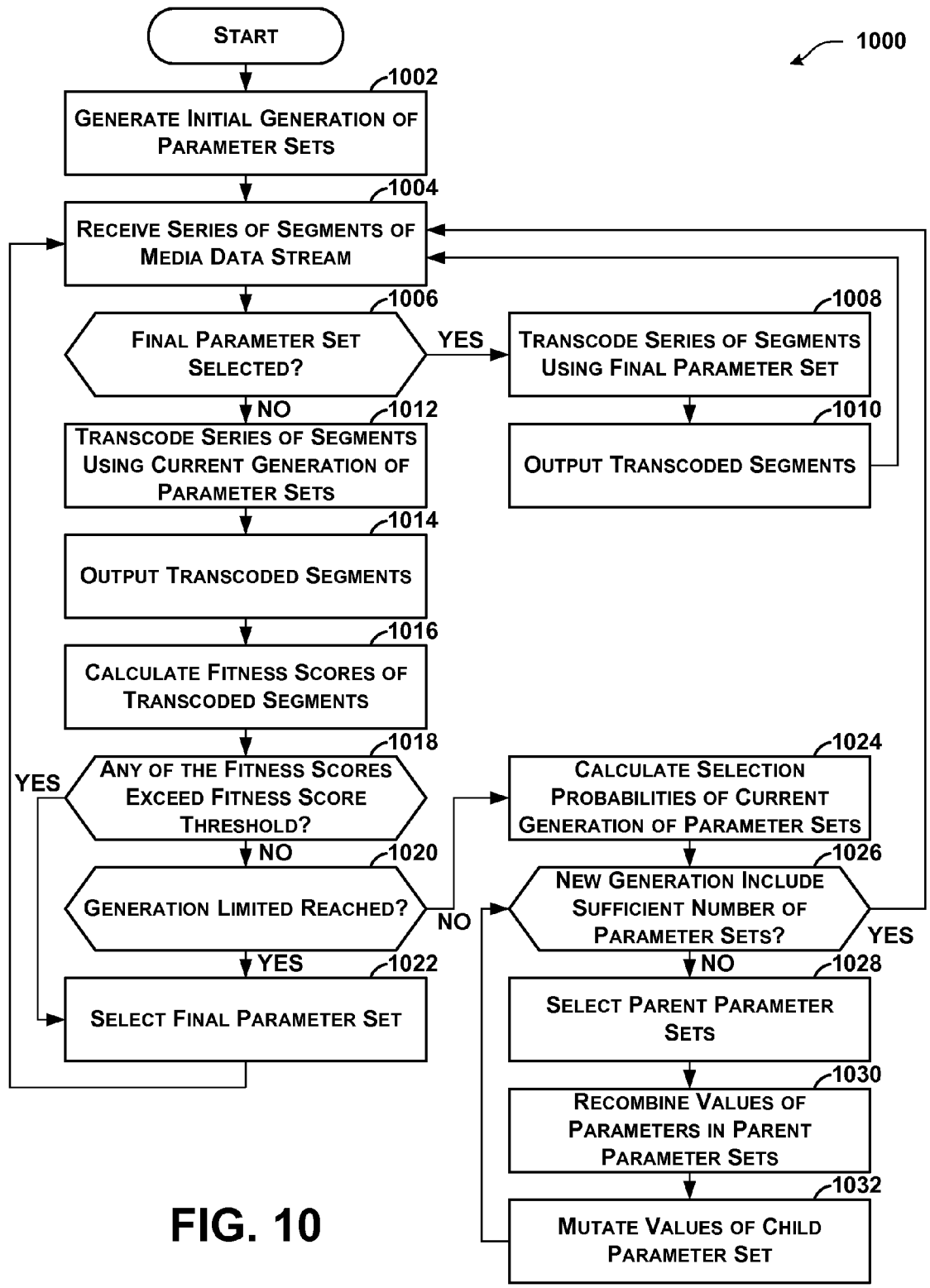
FIG. 10 is a flowchart illustrating yet another example operation for dynamically selecting a parameter set.

FIG. 10 is a flowchart illustrating yet another example operation 1000 for dynamically selecting a parameter set. It should be appreciated that other embodiments may use iterative operations that involve more or fewer steps, or may involve the steps of the operation 1000 in a different order. Furthermore, the operation 1000 is explained with reference to other figures in this patent document. It should be appreciated that other operations to generate parameter sets may be used in systems, devices, and operations other than those illustrated in the figures of this patent document.

As illustrated in the example of FIG. 10, the operation 1000 begins when the parameter identification module 306 generates an initial generation of parameter sets (1002). In different embodiments, the initial generation of parameter sets includes different numbers of parameter sets. For instance, in one example embodiment, the initial generation of parameter sets contains one hundred parameter sets. In another example embodiment, the initial generation of parameter sets includes sixty-four parameter sets. During a first iteration of the operation 1000, the initial generation of parameter sets is the current generation of parameter sets.

After generating the initial generation of parameter sets, the parameter identification module 306 receives a series of segments in a media data stream (1004). The number of segments in the set of segments is equal to the number of parameter sets in the initial generation of parameter sets. Upon receiving the series of segments, the parameter identification module 306 determines whether a final parameter set has been selected (1006). If a final parameter set has been selected ("YES" of 1006), the parameter identification module 306 transcodes each segment in the series of segments using the final parameter set (1008). Next, the parameter identification module 306 outputs the resulting set of transcoded segments to the output buffer 310 (1010). The parameter identification module 306 then receives another series of segments in the media data stream (1004), and the operation 1000 recurs.

On the other hand, if a final parameter set has not been selected ("NO" of 1006), the transcoder 308 transcodes each segment in the series of segments using a different parameter set in the current generation of parameter sets (1012). For instance, if the series of segments includes fifty segments, the transcoder 308 generates fifty transcoded segments, each encoded using a different parameter set in the current generation of parameter sets. After generating the transcoded segments, the parameter identification module 306 outputs the transcoded segments to the output buffer 310 (1014).

The parameter identification module 306 then calculates fitness scores for the transcoded segments (1016). In various embodiments, the parameter identification module 306 may use any of the techniques for calculating fitness scores discussed above with reference to FIG. 7. The parameter identification module 306 then determines whether any of the fitness scores for the transcoded segments exceeds a fitness score threshold (1018). In different embodiments, the parameter identification module 306 uses different fitness score thresholds. For instance, in one example embodiment where the parameter identification module 306 uses the structural similarity test to calculate fitness scores, the parameter identification module 306 uses a fitness score threshold of 0.9. In another example embodiment where the parameter identification module 306 uses the structural similarity test to calculate fitness scores, the parameter identification module 306 uses a fitness score threshold of 0.85.

If none of the fitness scores for the transcoded segments exceeds the fitness score threshold ("NO" of 1018), the parameter identification module 306 determines whether a generation limit has been exceeded (1020). The generation limit indicates a maximum number of generations of parameter sets generated by the parameter identification module 306 before a final parameter set is selected. If one or more of the fitness scores for the transcoded segments exceeds the fitness score threshold ("YES" of 1018) or if the generation limit has been reached ("YES" of 1020), the parameter identification module 306 selects a parameter set associated with a greatest fitness score as the final parameter set (1022). After selecting the final parameter set, the parameter identification module 306 receives another series of segments in the media data stream (1004), and the operation 1000 recurs.

If the generation limit has not been reached ("NO" of 1020), the parameter identification module 306 calculates selection probabilities for each parameter set in the current generation of parameter sets (1024). The selection probability for a parameter set is proportional to the fitness score of a transcoded segment generated using the parameter set.

The parameter identification module 306 then determines whether a new generation of parameter sets includes a sufficient number of parameter sets (1026). In one example embodiment, the new generation of parameter sets includes a sufficient number of parameter sets when the new generation of parameter sets includes the same number of parameter sets as the current generation of parameter sets.

If the parameter identification module 306 determines that the new generation of parameter sets does not include a sufficient number of parameter sets ("NO" of 1026), the parameter identification module 306 selects parent parameter sets from the current generation of parameter sets based on the selection probabilities of the parameter sets in the current generation of parameter sets (1028). Next, the parameter identification module 306 recombines the values of encoding parameters in the parent parameter sets to generate a child parameter set in the new generation of parameter sets (1030). The parameter identification module 306 then mutates the values of encoding parameters in the child parameter set (1032).

After mutating the values of encoding parameters in the child parameter set, the parameter identification module 306 again determines whether the new generation of parameter sets includes a sufficient number of parameter sets (1026), and so on. In this way, the parameter identification module 306 generates a new generation of parameter sets. If the parameter identification module 306 determines that the new generation of parameter sets includes a sufficient number of parameter sets ("YES" of 1026), the parameter identification module 306 receives another series of segments in the media data stream (1004), and the operation 1000 recurs.

The techniques of this patent document may be realized in many ways. For example, the techniques of this patent document may be realized as a method for distributing media data, the method comprising: performing, at a computing device, an iterative operation that selects a final parameter set. Each iteration of the iterative operation generates a parameter set and transcodes an initial segment into a transcoded segment using the parameter set. The method also comprises generating, at the computing device, a transcoded media data stream comprising a given transcoded segment. The given transcoded segment is a transcoded version of a given initial segment re-encoded using the final parameter set. The final parameter set was used during the iterative operation to encode a transcoded segment having a fitness score greater than fitness scores of each other transcoded segment generated by the iterative operation In another example, the techniques of this patent document may be realized as a computing device comprising a memory that stores software instructions and a processing unit. The software instructions, when executed by the processing unit, cause the computing device to perform an iterative operation that selects a final parameter set. Each iteration of the iterative operation generates a parameter set and transcoding an initial segment into a transcoded segment using the parameter set. The software instructions also cause the computing device to generate a transcoded media data stream comprising a given transcoded segment. The given transcoded segment is a transcoded version of a given initial segment re-encoded using the final parameter set. The final parameter set was used during the iterative operation to encode a transcoded segment having a fitness score greater than fitness scores of each other transcoded segment generated by the iterative operation. The software instructions also cause the computing device to transmit the transcoded media data stream to a client device via a computer communications network.

In yet another example, the techniques of this patent document may be realized as a computer readable data storage medium that stores software instructions that, when executed by a processing unit of a computing device, cause the computing device to perform an iterative operation that selects a final parameter set. Each iteration of the iterative operation generates a parameter set and transcodes an initial segment into a transcoded segment using the parameter set. The software instructions also cause the computing device to generate a transcoded media data stream comprising a given transcoded segment. The given transcoded segment is a transcoded version of a given initial segment re-encoded using the final parameter set. The final parameter set was used during the iterative operation to encode a transcoded segment having a fitness score greater than fitness scores of each other transcoded segment generated by the iterative operation.

In yet another example, the techniques of this patent document may be realized as a system for distributing media data. The system comprises a media source that streams an initial media data stream. The system also comprises a media processing system comprising a computer-readable data storage media storing software instructions that, when executed by a processor of the media processing system, cause the media processing system to receive the initial media data stream. The software instructions also cause the media processing system to perform an iterative operation that selects a final parameter set. Each iteration of the iterative operation generates a parameter set and transcodes an initial segment in the initial media data stream into a transcoded segment using the parameter set. The instructions also cause the computing device to generate a transcoded media data stream comprising a given transcoded segment. The given transcoded segment is a transcoded version of a given initial segment encoded using the final parameter set. The given initial segment is in the initial media data stream. The final parameter set having been used during the iterative operation to encode a transcoded segment having a fitness score greater than fitness scores of each other transcoded segment generated by the iterative operation. In addition, the software instructions cause the computing device to stream the transcoded media data stream to one or more client devices.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

I claim:

1. A method for distributing media data, the method comprising:
performing, by a device including a processor, an iterative operation until a final parameter set is selected for transcoding an initial segment, wherein each iteration of the iterative operation comprises:
transcoding the initial segment into a plurality of transcoded segments using parameter sets in a current generation of parameter sets;
calculating fitness scores of each transcoded segment in the plurality of transcoded segments;
determining whether a generation limit has been reached;
determining whether at least one of the fitness scores exceeds a fitness score threshold;
in response to the generation limit being reached or at least one of the fitness scores exceeding the fitness score threshold, outputting a given transcoded segment, the given transcoded segment being the transcoded segment generated by the iterative operation that has a fitness score greater than the fitness scores of each other transcoded segment generated by the iterative operation, and setting a parameter set employed for transcoding the initial segment into the given transcoded segment as the final parameter set; and
in response to the generation limit not being reached and none of the fitness scores exceeding the fitness score threshold:
calculating selection probabilities of the parameter sets in the current generation of parameter sets; and
performing the following steps until a new generation of parameter sets includes a threshold number of parameter sets:
selecting parent parameter sets based on the selection probabilities of the parameter sets in the current generation of parameter sets; and
generating a child parameter set in the new generation of parameter sets by recombining values of encoding parameters in the parent parameter sets; and
setting the new generation of parameter sets as the current generation of parameter sets; and
generating, by the device, a transcoded media data stream comprising the given transcoded segment.

2. The method of claim 1, further comprising: transmitting, by the device, the transcoded media data stream to a client device via a computer communications network.

3. The method of claim 1,
wherein the method further comprises:
receiving, by the device, an initial media data stream;
dividing, by the device, the initial media data stream into a plurality of initial segments, the initial segment being in the plurality of initial segments;
performing, by the device, the iterative operation for each initial segment in the plurality of initial segments; and
wherein generating the transcoded media data stream comprises: generating the transcoded media data stream such that the transcoded media data stream comprises a plurality of given transcoded segments, the plurality of given transcoded segments being generated by transcoding the plurality of initial segments.

4. The method of claim 3, further comprising: transmitting, by the device, the transcoded media data stream to a client device via a computer network.

5. The method of claim 4,
wherein the initial media data stream represents video that is substantially live; and
wherein the transcoded media data stream represents video that is substantially live.

6. The method of claim 1, wherein the method further comprises:
identifying, by the device, a representative segment of a media data stream, the representative segment being the initial segment; and
transcoding the media data stream into the transcoded media data stream using the final parameter set.

7. The method of claim 6, wherein identifying the representative segment comprises identifying a busiest segment of the initial media data stream.

8. The method of claim 1, further comprising:
receiving, by the device, via a computer communications network, a request for a media file that stores the initial media data stream; and
transmitting, by the device, the media file to a client device in response to the request.

9. The method of claim 1, wherein the new generations of parameter sets generated by each successive iteration of the iterative operation generate transcoded segments that have higher similarity to the initial segment than transcoded segments that result from transcoding the initial segment using the new generations of parameter sets generated by earlier iterations of the iterative operation.

10. The method of claim 1,
wherein the initial segment is encoded according to a first video encoding standard; and
wherein trans coding the initial segment comprises: transcoding the initial segment such that the transcoded segment is formatted according to a second video encoding standard, the first video encoding standard being different than the second video encoding standard.

11. The method of claim 1, wherein transcoding the initial segment comprises:
transcoding the initial segment such that the transcoded segment has a lower bit rate than the initial segment.

12. The method of claim 1, wherein the respective parameter sets include encoding parameters selected from a group comprising: a parameter indicating a motion estimation method, a parameter indicating a motion estimation range, a parameter indicating a quantization scale between I-frames and P-frames, a parameter indicating a quantization scale difference between P-frames and B-frames, a parameter indicating a quantization parameter curve compression value, a parameter indicating a maximum keyframe interval, a parameter indicating a minimum keyframe interval, a parameter indicating a complexity blur parameter, a parameter indicating a quantization blur parameter, a parameter indicating a motion estimation compare function, a parameter indicating whether to use an in-loop deblocking filter, a parameter indicating a scene change threshold, a parameter indicating whether to add B-frames into a normal reference list, a parameter indicating whether to allow or disallow B-frames to use weight prediction options, a parameter indicating whether to allow each macroblock to use different references, a parameter indicating whether to allow or disallow skipping of P-macroblocks that do not appear to change, a parameter indicating whether to allow or disallow an encoder to use access unit delimiters, a value indicating whether to allow or disallow the encoder to choose which coefficients to round up or down, a parameter indicating a minimum quantizer, a parameter indicating a maximum quantizer, a parameter indicating a minimum step of a quantization parameter, a parameter indicating a number of frame to reference, a parameter indicating a predicting mode, a parameter indicating allowed combinations of partitions in macroblocks, a parameter indicating a maximum number of B-frames between keyframes, a parameter indicating how adaptive B-frame look ahead is, a parameter indicating an entropy encoder, a parameter indicating an alpha value for use in in-loop deblocking, a parameter indicating a beta value for use in in-loop deblocking, a parameter indicating a constant quality mode, and a parameter indicating algorithms used for both subpixel motion searching and partition decisions.

13. A system comprising:
a processor; and
a memory communicatively coupled to the processor, the memory having stored therein computer-executable instructions comprising:
a parameter identification module configured to perform an iterative operation until a final parameter set is selected to transcode an initial segment, wherein each iteration of the iterative operation comprises:
transcode an initial segment into a plurality of transcoded segments using parameter sets in a current generation of parameter sets;
calculate fitness scores of each transcoded segment in the plurality of transcoded segments;
determine whether a generation limit has been reached;
determine whether one of the fitness scores exceeds a fitness score threshold;
in response to the generation limit being reached or at least one of the fitness scores exceeding the fitness score threshold, output a given transcoded segment, the given transcoded segment being the transcoded segment generated by the iterative operation that has a fitness score greater than the fitness scores of each other transcoded segment generated by the iterative operation, and set a parameter set employed for transcoding the initial segment into the given transcoded segment as the final parameter set; and
in response to the generation limit not being reached and none of the fitness scores exceeding the fitness score threshold:
calculate selection probabilities of the parameter sets in the current generation of parameter sets; and
perform the following steps until a new generation of parameter sets includes a threshold number of parameter sets:
select parent parameter sets based on the selection probabilities of the parameter sets in the current generation of parameter sets; and
generate a child parameter set in the new generation of parameter sets by recombining values of encoding parameters in the parent parameter sets; and
set the new generation of parameter sets as the current generation of parameter sets; and
a transcoder configured to generate a transcoded media data stream comprising the given transcoded segment.

14. The system of claim 13, wherein the parameter identification module is further configured to:
receive an initial media data stream;
divide the initial media data stream into a plurality of initial segments that includes the initial segment;
transcode each initial segment in the plurality of initial segments into given transcoded segments using parameter sets generated by performing the iterative operation; and
wherein the transcoder is further configured to generate the transcoded media data stream such that the transcoded media data stream comprises the given transcoded segments.

15. The system of claim 14,
wherein the initial media data stream represents video that is substantially live; and
wherein the transcoded media data stream represents video that is substantially live.

16. The system of claim 13, wherein the parameter identification module is further configured to
identify a representative segment of a media data stream, the representative segment being the initial segment, and the transcoder is further configured to
transcode the media data stream into the transcoded media data stream using the final parameter set.

17. The system of claim 16, wherein the representative is a busiest segment of the media file.

18. A non-transitory computer readable medium having instructions stored thereon that, in response to execution, cause system including a processor to perform operations comprising:
performing an iterative operation until a final parameter set is selected for transcoding an initial segment, wherein each iteration of the iterative operation comprises:
transcoding the initial segment into a plurality of transcoded segments using parameter sets in a current generation of parameter sets;
calculating fitness scores of each transcoded segment in the plurality of transcoded segments;
determining whether a generation limit has been reached;
determining whether one of the fitness scores exceeds a fitness score threshold;
in response to the generation limit being reached or at least one of the fitness scores exceeding the fitness score threshold, outputting a given transcoded segment, the given transcoded segment being the transcoded segment generated by the iterative operation that has a fitness score greater than the fitness scores of each other transcoded segment generated by the iterative operation, and setting a parameter set employed for transcoding the initial segment into the given transcoded segment as the final parameter set; and
in response to the generation limit not being reached and none of the fitness scores exceeding the fitness score threshold:
calculating selection probabilities of the parameter sets in the current generation of parameter sets; and
performing the following steps until a new generation of parameter sets includes a threshold number of parameter sets:
selecting parent parameter sets based on the selection probabilities of the parameter sets in the current generation of parameter sets; and
generating a child parameter set in the new generation of parameter sets by recombining values of encoding parameters in the parent parameter sets; and setting the new generation of parameter sets as the current generation of parameter sets; and generating a transcoded media data stream comprising the given transcoded segment.

19. The non-transitory computer readable medium of claim 18, the operations further comprising transmitting the transcoded media data stream to a client device via a computer communications network.

20. The non-transitory computer readable medium of claim 18, the operations further comprising:
receiving an initial media data stream;
dividing the initial media data stream into a plurality of initial segments, the initial segment being in the plurality of initial segments;
performing the iterative operation for each initial segment in the plurality of initial segments; and
wherein generating the transcoded media data stream comprises: generating the transcoded media data stream such that the transcoded media data stream comprises a plurality of given transcoded segments, the plurality of given transcoded segments being generated by transcoding the plurality of initial segments.

21. The non-transitory computer readable medium of claim 20, the operations further comprising transmitting the transcoded media data stream to a client device via a computer network.

22. The non-transitory computer readable medium of claim 18, wherein the initial media data stream represents video that is substantially live, and wherein the transcoded media data stream represents video that is substantially live.

23. The non-transitory computer readable medium of claim 18, the operations further comprising:
identifying a representative segment of a media data stream, the representative segment being the initial segment; and
transcoding the media data stream into the transcoded media data stream using the final parameter set.

24. The non-transitory computer readable medium of claim 23, wherein identifying the representative segment comprises identifying a busiest segment of the initial media data stream.

25. The non-transitory computer readable medium of claim 18, the operations further comprising:
receiving, via a computer communications network, a request for a media file that stores the initial media data stream; and
transmitting the media file to a client device in response to the request.

26. The non-transitory computer readable medium of claim 18, wherein the new generations of parameter sets generated by each successive iteration of the iterative operation generate transcoded segments that have higher similarity to the initial segment than transcoded segments that result from transcoding the initial segment using the new generations of parameter sets generated by earlier iterations of the iterative operation.

27. A system comprising:
means for performing an iterative operation until a final parameter set is selected for transcoding an initial segment, wherein each iteration of the iterative operation comprises:
transcoding the initial segment into a plurality of transcoded segments using parameter sets in a current generation of parameter sets;
calculating fitness scores of each transcoded segment in the plurality of transcoded segments;
determining whether a generation limit has been reached;
determining whether one of the fitness scores exceeds a fitness score threshold;
in response to the generation limit being reached or at least one of the fitness scores exceeding the fitness score threshold, outputting a given transcoded segment, the given transcoded segment being the transcoded segment generated by the iterative operation that has a fitness score greater than the fitness scores of each other transcoded segment generated by the iterative operation, and setting a parameter set employed for transcoding the initial segment into the given transcoded segment as the final parameter set; and
in response to the generation limit not being reached and none of the fitness scores exceeding the fitness score threshold:
calculating selection probabilities of the parameter sets in the current generation of parameter sets; and
performing the following steps until a new generation of parameter sets includes a threshold number of parameter sets:
selecting parent parameter sets based on the selection probabilities of the parameter sets in the current generation of parameter sets; and
generating a child parameter set in the new generation of parameter sets by recombining values of encoding parameters in the parent parameter sets; and
setting the new generation of parameter sets as the current generation of parameter sets; and
means for generating a transcoded media data stream comprising the given transcoded segment.

* * * * *